United States Patent
Silva et al.

(10) Patent No.: US 11,684,929 B2
(45) Date of Patent: *Jun. 27, 2023

(54) GRINDING STABILIZING ADDITIVE FOR VERTICAL ROLLER MILLS

(71) Applicant: GCP Applied Technologies Inc., Cambridge, MA (US)

(72) Inventors: Denise A. Silva, Los Alamitos, CA (US); Josephine H. Cheung, Lexington, MA (US); David F. Myers, Somerville, MA (US); Byong-Wa Chun, Honolulu, HI (US); Ernie Rocha, Merrimack, NH (US); Wee Fuk Lai, Singapore (SG); Leslie J. Buzzell, Burlington, MA (US); Jeffrey Thomas, Winchester, MA (US); Joshua Detellis, Framingham, MA (US)

(*) Notice: Subject to any disclaimer, the term of this patent is extended or adjusted under 35 U.S.C. 154(b) by 956 days.

This patent is subject to a terminal disclaimer.

(21) Appl. No.: 16/485,716

(22) PCT Filed: Jan. 5, 2018

(86) PCT No.: PCT/US2018/012632
§ 371 (c)(1),
(2) Date: Aug. 13, 2019

(87) PCT Pub. No.: WO2018/147952
PCT Pub. Date: Aug. 16, 2018

(65) Prior Publication Data
US 2020/0047188 A1    Feb. 13, 2020

Related U.S. Application Data

(63) Continuation-in-part of application No. PCT/US2017/058226, filed on Oct. 25, 2017.
(Continued)

(51) Int. Cl.
| | |
|---|---|
| *B02C 23/06* | (2006.01) |
| *B02C 23/18* | (2006.01) |
| *C04B 7/52* | (2006.01) |
| *C04B 24/02* | (2006.01) |
| *C04B 24/06* | (2006.01) |
| *C04B 24/10* | (2006.01) |
| *C04B 24/12* | (2006.01) |

(Continued)

(52) U.S. Cl.
CPC ............ *B02C 23/06* (2013.01); *B02C 23/18* (2013.01); *C04B 7/52* (2013.01); *C04B 7/522* (2013.01); *C04B 24/005* (2013.01); *C04B 24/02* (2013.01); *C04B 24/06* (2013.01); *C04B 24/10* (2013.01); *C04B 24/121* (2013.01); *C04B 24/122* (2013.01); *C04B 24/123* (2013.01); *C04B 24/16* (2013.01); *C04B 24/38* (2013.01); *B21B 27/027* (2013.01); *C04B 2103/52* (2013.01); *C04B 2103/60* (2013.01)

(58) Field of Classification Search
CPC .......... C04B 7/52; C04B 7/522; C04B 14/10; C04B 14/28; C04B 18/08; C04B 18/141; C04B 20/026; C04B 22/10; C04B 22/14; C04B 22/16; C04B 22/124; C04B 22/143; C04B 24/005; C04B 24/02; C04B 24/04; C04B 24/06; C04B 24/085; C04B 24/10; C04B 24/12; C04B 24/121; C04B 24/122; C04B 24/123; C04B 24/124; C04B 24/16; C04B 24/38; C04B 28/04; C04B 40/0039; C04B 2103/0088; C04B 2103/12; C04B 2103/14; C04B 2103/22; C04B 2103/52; C04B 2103/60; C04B 2103/302; C04B 2103/304; B02C 23/06; B02C 23/18; C09C 1/025; C09C 1/021; C09C 1/02; C09C 3/08; C09C 3/041; Y02P 40/10; Y02W 30/91
See application file for complete search history.

(56) References Cited

U.S. PATENT DOCUMENTS

| | | |
|---|---|---|
| 4,715,544 A | 12/1987 | Folsberg |
| 5,156,679 A | 10/1992 | Gartner et al. |

(Continued)

FOREIGN PATENT DOCUMENTS

| | | | |
|---|---|---|---|
| CN | 106116209 A | * | 11/2016 |
| EP | 2594540 | | 5/2013 |

(Continued)

OTHER PUBLICATIONS

Philippart, Forms PCT/ISA/210&237, International Search Report & Written Opinion for PCT/US2017/058226, dated Jul. 6, 2018, 16 pages.

(Continued)

*Primary Examiner* — Anthony J Green
(74) *Attorney, Agent, or Firm* — Joseph D. Rossi

(57) ABSTRACT

A method for grinding a solid in a vertical roller mill (VRM), comprising grinding at least one solid in the presence of a grinding stabilizing additive, wherein the grinding stabilizing additive comprises an alkanol amino acid compound or a disodium or dipotassium salt thereof having the structural formula (I): The definitions of variables $R^1$, $R^2$, and $R^3$ are provided herein.

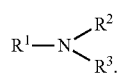

(I)

35 Claims, 7 Drawing Sheets

Related U.S. Application Data

(60) Provisional application No. 62/458,380, filed on Feb. 13, 2017, provisional application No. 62/508,636, filed on May 19, 2017.

(51) Int. Cl.

| | | |
|---|---|---|
| *C04B 24/16* | (2006.01) | |
| *C04B 24/00* | (2006.01) | |
| *C04B 24/38* | (2006.01) | |
| *B21B 27/02* | (2006.01) | |
| *C04B 103/52* | (2006.01) | |
| *C04B 103/60* | (2006.01) | |

(56) References Cited

U.S. PATENT DOCUMENTS

| | | | |
|---|---|---|---|
| 5,211,751 A | 5/1993 | Arfaei | |
| 6,213,415 B1 | 4/2001 | Cheung | |
| 7,028,934 B2 | 4/2006 | Burynski, Jr. et al. | |
| 2014/0150694 A1 * | 6/2014 | Marazzani | C04B 24/122 106/790 |
| 2017/0226011 A1 * | 8/2017 | Müller | C04B 24/02 |

FOREIGN PATENT DOCUMENTS

| | | | |
|---|---|---|---|
| EP | 3109215 A1 * | 12/2016 | ........... C04B 28/065 |
| WO | 9715535 | 1/1997 | |
| WO | 2011161447 | 12/2011 | |
| WO | WO-2015152522 A1 * | 10/2015 | ............. C04B 24/02 |
| WO | 2016196456 | 12/2016 | |

OTHER PUBLICATIONS

Philippart, Forms PCT/ISA/210&237, International Search Report & Written Opinion for PCT/US2018/012632, dated Jul. 4, 2018, 11 pages.

* cited by examiner

| Cement | Alite | Belite | $C_3A$ | $C_4AF$ | CaO | MgO | $Ca(OH)_2$ | Calcite | Gypsum | Hemihydrate | Anhydrite | Total $SO_3$ | Total Alkali | 1 day strength with 0.02% $Na_2$-EDG (% reference) |
|---|---|---|---|---|---|---|---|---|---|---|---|---|---|---|
| A | 59.6 | 11.8 | 10.6 | 5.4 | 0.0 | 3.5 | 0.4 | 2.2 | 1.3 | 3.6 | 0.6 | 2.6 | 0.4 | 120.9 |
| B | 71.8 | 5.3 | 3.5 | 11.6 | 0.0 | 0.4 | 0.2 | 0.9 | 1.9 | 3.4 | 0.0 | 2.7 | 0.3 | 116.3 |
| C | 54.1 | 22.2 | 1.4 | 11.1 | 0.1 | 0.1 | 0.0 | 3.9 | 1.1 | 1.2 | 3.5 | 3.4 | 0.3 | 115.7 |
| D | 53.7 | 27.3 | 2.1 | 9.2 | 0.0 | 0.0 | 0.0 | 1.4 | 1.9 | 3.5 | 0.1 | 3.7 | 0.3 | 115.3 |
| E | 70.1 | 8.2 | 3.4 | 11.3 | 0.0 | 0.4 | 0.1 | 1.2 | 1.7 | 3.1 | 0.1 | 2.4 | 0.3 | 114.4 |
| F | 68.2 | 6.4 | 6.4 | 8.3 | 0.0 | 3.0 | 0.9 | 1.2 | 2.2 | 3.2 | 0.0 | 2.5 | 0.1 | 113.4 |
| G | 66.5 | 11.6 | 4.1 | 8.3 | 0.0 | 2.0 | 0.1 | 0.9 | 2.0 | 3.4 | 0.2 | 3.5 | 0.6 | 111.8 |
| H | 51.1 | 28.4 | 2.1 | 10.9 | 0.3 | 0.2 | 0.0 | 0.3 | 1.9 | 3.2 | 0.4 | 4.3 | 0.4 | 110.3 |
| I | 52.3 | 30.8 | 2.0 | 10.0 | 0.3 | 0.1 | 0.0 | 0.6 | 1.0 | 2.4 | 0.2 | n/a | n/a | 108.4 |
| J | 61.0 | 16.5 | 3.7 | 10.2 | 0.2 | 1.0 | 0.1 | 1.1 | 1.6 | 3.0 | 0.1 | 3.0 | 0.6 | 107.7 |
| K | 61.6 | 14.0 | 3.9 | 7.7 | 0.0 | 2.5 | 0.2 | 4.6 | 0.0 | 4.3 | 0.1 | 2.8 | 0.6 | 106.2 |

FIG. 4A

| Cement | Alite | Belite | C₃A | C₄AF | CaO | MgO | Ca(OH)₂ | Calcite | Gypsum | Hemihydrate | Anhydrite | Total SO3 | Total Alkali | 1 day strength with 0.02% Na₂-EDG (% reference) |
|---|---|---|---|---|---|---|---|---|---|---|---|---|---|---|
| L | 71.6 | 6.4 | 3.3 | 10.3 | 0.0 | 0.7 | 0.4 | 0.5 | 2.0 | 3.5 | 0.1 | 2.9 | 0.1 | 104.9 |
| M | 65.8 | 9.3 | 2.9 | 8.5 | 0.3 | 1.3 | 0.7 | 3.9 | 4.1 | 0.8 | 0.0 | 3.5 | 0.5 | 103.8 |
| N | 60.4 | 10.9 | 5.3 | 8.4 | 0.0 | 3.9 | 0.2 | 4.7 | 0.8 | 4.3 | 0.0 | 3.2 | 0.7 | 103.8 |
| O | 65.8 | 9.3 | 2.9 | 8.5 | 0.3 | 1.3 | 0.7 | 3.9 | 4.1 | 0.8 | 0.0 | 3.5 | 0.5 | 103.3 |
| P | 63.7 | 4.8 | 3.3 | 8.6 | 0.7 | 0.4 | 0.5 | 9.6 | 3.8 | 2.5 | 0.0 | 3.2 | 0.7 | 103.3 |
| Q | 62.0 | 10.8 | 6.0 | 8.5 | 0.0 | 0.3 | 0.4 | 5.5 | 1.2 | 4.0 | 0.1 | 3.2 | 0.4 | 102.6 |
| R | 56.6 | 19.1 | 6.6 | 10.1 | 1.1 | 0.3 | 0.2 | 0.5 | 1.7 | 2.9 | 0.1 | 2.9 | 0.6 | 102.1 |
| S | 51.7 | 25.4 | 6.2 | 8.7 | 0.0 | 0.0 | 0.1 | 0.9 | 2.4 | 3.4 | 0.1 | 2.9 | 0.5 | 101.5 |
| T | 55.2 | 23.7 | 4.0 | 10.3 | 0.1 | 0.4 | 0.1 | 0.7 | 1.1 | 3.7 | 0.2 | 2.7 | 0.4 | 100.6 |
| U | 57.3 | 17.1 | 4.6 | 8.5 | 0.0 | 2.9 | 0.7 | 3.4 | 1.4 | 3.0 | 0.1 | 3.1 | 0.5 | 98.9 |
| V | 65.0 | 11.1 | 10.3 | 5.0 | 0.0 | 1.4 | 0.2 | 1.3 | 2.5 | 1.2 | 0.0 | 3.5 | 1.0 | 95.4 |
| W | 51.9 | 9.8 | 6.4 | 6.8 | 0.1 | 0.1 | 0.4 | 17.8 | 2.1 | 3.5 | 0.1 | n/a | n/a | n/a |

FIG. 4B

GRINDING STABILIZING ADDITIVE FOR VERTICAL ROLLER MILLS

RELATED APPLICATIONS

This application is a continuation-in-part of International Application No. PCT/US2017/058226, which designated the United States and was filed on Oct. 25, 2017, which claims the benefit of U.S. Provisional Application No. 62/458,380, filed on Feb. 13, 2017 and U.S. Provisional Application No. 62/508,636, filed on May 19, 2017. The entire teachings of the above applications are incorporated herein by reference.

BACKGROUND OF THE INVENTION

Vertical Roller Mills ("VRM") work by grinding materials using rollers that exert force on the solid being ground, typically placed on a rotating bed or table. VRMs are believed to have advantages over ball mills, such as lower energy consumption, smaller footprint, faster setup, greater product outputs, and often more control over particle size distribution.

One problem of VRMs is milling instability. It is current practice to spray water onto the layer of material passing under the grinding rollers to stabilize the mill. When the grinding process of VRMs begins to de-stabilize, the VRM structure can begin to shake and create vibrations that can be felt in adjacent buildings, even considerable distances from the mill. This vibration can damage the VRM, so the mill will be shut down if the vibrations exceed a preset limit. While adding water is effective at reducing vibrations, it can pre-hydrate the cement, which has a negative effect on its properties, including but not limited to a decrease in strength. Thus, there is a need for chemicals that can stabilize the mill, as well as permit less water spray use.

SUMMARY OF THE INVENTION

It has now been discovered that certain amino acid derivatives that include a carboxyl group (in either acid or salt form), an amine and an alcohol group, such as ethanol diglycine (EDG), surprisingly reduces VRM milling instability. In example embodiments, the solid being ground comprises one or more of a cement clinker, gypsum, a supplemental cementitious matter, or a mixture thereof.

In one example embodiment, the present invention is a method for grinding a solid in a vertical roller mill (VRM). The method comprises grinding at least one solid in the presence of a grinding stabilizing additive, wherein the grinding stabilizing additive comprises an alkanol amino acid compound or a disodium or dipotassium salt thereof having the structural formula:

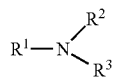

wherein $R^1$ is $(C_1-C_4)$alkyl-OH; and $R^2$ and $R^3$, each independently, is $(C_0-C_3)$alkyl-COOR*, wherein R* is H, Na$^+$, K$^+$, or ½ Ca$^{++}$.

In another example embodiment, the present invention is an additive composition for grinding, comprising: (a) EDG, isopropanol diglycine (IPDG), or mixture thereof; (b) at least one alkanolamine or amine chosen from diethanolamine (DEIPA), ethanol diisopropanolamine (EDIPA), triisopropanolamine (TIPA), triethanolamine (TEA), tetrahydroxyethyl ethylenediamine (THEED), DEIPA acetate, EDIPA acetate, TIPA acetate, TEA acetate, THEED acetate, and mixture thereof; (c) sodium acetate; or a mixture of any of the foregoing.

In another example embodiment, the present invention an additive composition for grinding, comprising EDG or IPDG, or a mixtures of the forgoing diglycines; diethylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In another example embodiment, the present invention is an additive composition for grinding, comprising EDG, IPDG, or a mixture of the forgoing diglycines; tripropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In another example embodiment, the present invention is an additive composition for grinding, comprising EDG, IPDG, or a mixture of the foregoing diglycines; at least one glycols chosen from diethylene glycol, tripropylene glycol, and tetrapropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In another example embodiment, the present invention is an additive composition for grinding, comprising at least one glycol chosen from diethylene glycol, tripropylene glycol, and tetrapropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In another example embodiment, the present invention is an additive composition for grinding, comprising tripropylene glycol and at least one alkanolamine chosen from TEA, DEIPA, EDIPA, TIPA, THEED, the acetate of any of the foregoing alkanolamines, or a mixture of any of the foregoing alkanolamines and acetates thereof.

In another embodiment, the present invention is an additive composition for grinding, comprising tripropylene glycol (TPG); at least one alkanolamine chosen from TEA, DEIPA, EDIPA, TIPA, THEED, the acetate of any of the foregoing alkanolamines, or a mixture of any of the foregoing alkanolamines and acetates thereof; and, optionally, EDG.

The grinding stabilizing additive described above can be combined with one or more grinding agent chosen from a glycol (e.g., diethylene glycol, tripropylene glycol) or glycerin, supplemental agent chosen from a tertiary alkanolamine or an acetate salt thereof, a set retarding agent chosen from gluconate salt, a molasses, sucrose, or a corn syrup, a set accelerating agent chosen from a thiocyanate salt, chloride salt, or mixture thereof, a dispersing agent chosen from sodium acetate, potassium acetate, or mixture thereof to provide value and flexibility to cement manufacturers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4A and FIG. 4B, collectively, represent Table 1 of Example 1.

FIG. 5, panel B, shows the NMR spectrum of Sample B, described in Example 6.

DETAILED DESCRIPTION OF THE INVENTION

Figure 1:
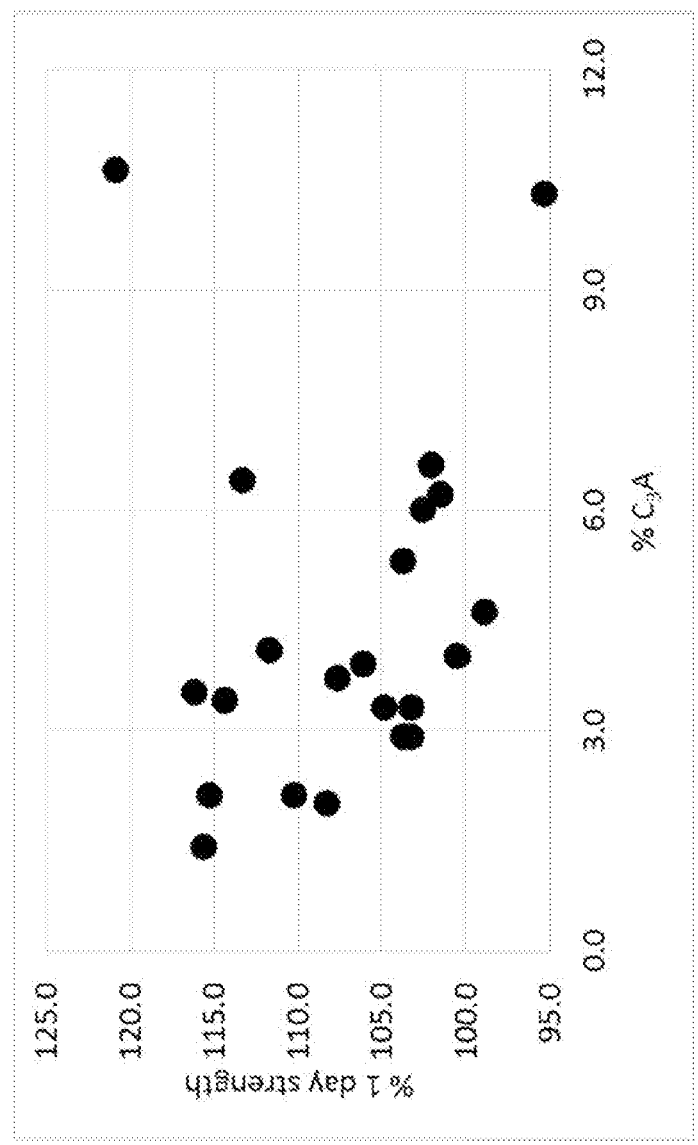
FIG. 1 is a plot of a change (in percent relative to a control) of compressive strength of a mortar made with cement A at Day 1 post mortar preparation as a function of $C_3A$ content. $Na_2$-EDG was added to the samples at 0.02% by weight of the cementitious material.

A description of example embodiments of the invention follows.

The conventional cement chemist's notation uses the following abbreviations:
CaO=C
$SiO_2$=S
$Al_2O_3$=A
$Fe_2O_3$=F
Under this notation, the following abbreviations are used:
tricalcium silicate=$C_3S$
dicalcium silicate=$C_2S$
tricalcium aluminate=$C_3A$
tetracalcium aluminoferrite=$C_4AF$ As used herein, "alkyl" means an optionally substituted saturated aliphatic branched or straight-chain monovalent hydrocarbon radical having the specified number of carbon atoms. Thus, "$(C_1-C_4)$ alkyl" means a radical having from 1-4 carbon atoms in a linear or branched arrangement. "$(C_1-C_4)$alkyl" includes methyl, ethyl, propyl, isopropyl, n-butyl and tert-butyl.

As used herein, "alkanolamine" means an alkyl, typically a C1-C6 alkyl, functionalized with at least one amino group and at least one hydroxyl group. A "tertiary alkanolamine" includes an amino group in which all three hydrogens are replaced with a substituent, typically, an optionally substituted C1-C6 alkyl. Examples of tertiary alkanolamines include triethanolamine or TEA, diethanol isopropanolamine or DEIPA, ethanol diisopropanolamine or EDIPA, and tri-isopropanolamine or TIPA (typically used as conventional grinding aids in cement production).

As used herein, the term "amino acid" refers to a compound having both an amino —$NH_2$ and a carboxy —$CO_2H$ functionalities. The term includes both a naturally occurring amino acid and a non-natural amino acid. The term "amino acid," unless otherwise indicated, includes both isolated amino acid molecules (i.e. molecules that include both, an amino-attached hydrogen and a carbonyl carbon-attached hydroxyl) and residues of amino acids (i.e. molecules in which either one or both an amino-attached hydrogen or a carbonyl carbon-attached hydroxyl are removed). The amino group can be alpha-amino group, beta-amino group, etc. For example, the term "amino acid alanine" can refer either to an isolated alanine H-Ala-OH or to any one of the alanine residues H-Gly-, -Gly-OH, or -Gly-. Unless otherwise indicated, all amino acids found in the compounds described herein can be either in D or L configuration or a mixture. The term "amino acid" includes salts thereof.

An amino acid can be modified with additional functional groups. Examples of the additional functional groups include additional amino groups, additional carboxyl groups, and hydroxyl groups. Such modified amino acids can be referred to as "amino acid derivatives." Examples of such amino acid derivatives include amino acids that include two carboxyl groups and one alcohol group, such as ethanol diglycine (EDG).

As used herein, "glycol" refers to any one of an alkyl polyol compounds formed by oligomerization or polymerization of an alkyl diol via an ether bond formation. In example embodiments, a glycol is a polymer or an oligomer of a C2-C4 alkyl diol. For example, a glycol suitable to be used in this invention includes diethylene glycol, polyethylene glycol, monopropylene glycol, dipropylene glycol, tripropylene glycol, tetrapropylene glycol, or mixtures thereof. The term "glycol," as used herein, can also refer to "glycol bottoms," i.e. mixed glycols typically comprised of ethylene glycol, diethylene glycol, triethylene glycol, and tetraethylene glycol, often with color and other impurities.

As used herein, the term "glycerin" refers to propane-1, 2,3-triol, both in purified and in crude form. For example, "glycerin," as used herein, can refer to a crude glycerin, such as a byproduct obtained in the manufacture of biodiesel.

As used herein, "acetic acid" refers to a compound having the structural formula $CH_3COOH$. Salts of acetic acid (acetate salts) include salts of the alkali metals (Group I of the periodic table, such as sodium and potassium), and salts of alkali-earth metals (Group II of the periodic table, such as $Ca^{2+}$). Preferred among these are sodium, potassium, and calcium acetate.

As used herein, "gluconic acid" refers to the compound having the following structural formula:

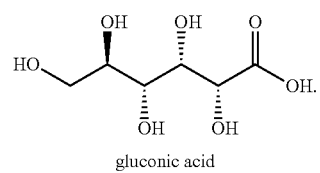 [SMILES: O=C(O)[C@H](O)[C@@H](O)[C@H](O)[C@H](O)CO]

gluconic acid

Salts of gluconic acid include ammonium salts, alkali metal salts (sodium and potassium), alkali-earth metal salts (calcium), and salts of iron, zinc, and aluminum.

As used herein, "sucrose" refers to a disaccharide combination of the monosaccharides glucose and fructose with the formula $C_{12}H_{22}O_{11}$.

As used herein, "corn syrup" refers to syrup made from cornstarch, consisting of dextrose, maltose, and dextrins.

As used herein, "molasses" refers to thick, dark brown syrup obtained from raw sugar during the refining process.

As used herein, a "chloride salt" refers to an alkali metal (Group I of the periodic table, e.g., sodium or potassium) or an alkali-earth (Group II of the periodic table, e.g., calcium) salts of hydrochloric acid.

As used herein, a "thiocyanate salts" refers to an alkali metal (Group I of the periodic table, e.g., sodium or potassium) or an alkali-earth (Group II of the periodic table, e.g., calcium) salts of thiocyanic acid.

As used herein, a "nitrite salt" refers to an alkali metal (Group I of the periodic table, e.g., sodium or potassium) or an alkali-earth (Group II of the periodic table, e.g., calcium) salts of nitrous acid ($HNO_2$).

As used herein, a "nitrate salt" refers to an alkali metal (Group I of the periodic table, e.g., sodium or potassium) or an alkali-earth (Group II of the periodic table, e.g., calcium) salts of nitric acid ($HNO_3$).

As used herein, an "alkali sulfate" refers to an alkali metal (Group I of the periodic table, e.g., sodium or potassium) or an alkali-earth (Group II of the periodic table, e.g., calcium) salts of sulfuric acid ($H_2SO_4$).

As used herein, an "alkali carbonate" refers to an alkali metal (Group I of the periodic table, e.g., sodium or potassium) or an alkali-earth (Group II of the periodic table, e.g., calcium) salts of carbonic acid ($H_2CO_3$).

The term "amine," as used herein, means an "$NH_3$," an "$NH_2R_p$," an "$NHR_pR_q$," or an "$NR_pR_qR_s$" group. The term "amino", as used herein, refers to a mono-, bi-, or trivalent radical of the amine. In either the amine or amino groups, $R_p$, $R_q$, $R_q$ can each be a C1-C6 alkyl, optionally substituted with the one or more hydroxyl groups or amino groups. The term "diamine" as used herein, means a "$R_pR_qNANR_sR_t$" group, wherein $R_p$, $R_q$, $R_s$, and $R_t$ can each be a hydroxyl (C1-C6)alkyl and moiety A can be a C1-C4 alkylene. Examples of a diamine include tetrahydroxylethylene diamine (THEED).

As used herein, the term "carbohydrate" refers to polysaccharide cement additives, usually used as cement retarders. Examples include celluloses, exemplified by carboxymethylated hydroxyethylated celluloses, gum arabic and guar gum. Gum arabic is a product of an acacia tree of tropical Africa and is entirely soluble in water. Guar gum is derived from the seed of an annual plant which is cultivated in India. These products consist mainly of a polysaccharide of galactose and mannose.

As used herein, the term "a haloacetic acid," unless specifically indicated, refers to any one of mono-, di-, or tri-substituted acetic acid analogs, or a mixture thereof. For example, the "chloroacetic acid" refers to any one of the following compounds or a mixture thereof: Cl—$CH_2$—COOH, $Cl_2$CH—COOH, or $Cl_3$C—COOH.

As used herein, the phrase "under alkaline condition" refers to the reaction conditions where the pH of the reaction mixture is greater than 7.

As used herein, the phrase "room temperature" refers to the temperature of about 21 to 25° C.

The content of all components in the compositions described below is indicated relative to the dry weight of the composition.

The terms "cement composition" or "cementitious powder" is used herein to designate a binder or an adhesive that includes a material that will solidify upon addition of water (hydraulic cementitious material), and an optional additive. Most cementitious materials are produced by high-temperature processing of calcined lime and a clay. When mixed with water, hydraulic cementitious materials form mortar or, mixed with sand, gravel, and water, make concrete. The terms "cementitious material," "cementitious powder," and "cement" can be used interchangeably.

Cement compositions includes mortar and concrete compositions comprising a hydraulic cement. Cement compositions can be mixtures composed of a cementitious material, for example, Portland cement, either alone or in combination with other components such as fly ash, silica fume, blast furnace slag, limestone, natural pozzolans or artificial pozzolans, and water; mortars are pastes additionally including fine aggregate, and concretes are mortars additionally including coarse aggregate. The cement compositions of this invention are formed by mixing certain amounts of required materials, e.g., a hydraulic cement, water, and fine or coarse aggregate, as may be applicable for the particular cement composition being formed.

As used herein, the term "clinker" refers to a material made by heating limestone (calcium carbonate) with other materials (such as clay) to about 1450° C. in a kiln, in a process known as calcination, whereby a molecule of carbon dioxide is liberated from the calcium carbonate to form calcium oxide, or quicklime, which is then blended with the other materials that have been included in the mix to form calcium silicates and other cementitious compounds.

As used herein, the term "Portland cement" include all cementitious compositions which meet either the requirements of the ASTM (as designated by ASTM Specification C150), or the established standards of other countries. Portland cement is prepared by sintering a mixture of components including calcium carbonate (as limestone), aluminum silicate (as clay or shale), silicon dioxide (as sand), and miscellaneous iron oxides. During the sintering process, chemical reactions take place wherein hardened nodules, commonly called clinkers, are formed. Portland cement clinker is formed by the reaction of calcium oxide with acidic components to give, primarily tricalcium silicate, dicalcium silicate, tricalcium aluminate, and a ferrite solid solution phase approximating tetracalcium aluminoferrite.

After the clinker has cooled, it is pulverized together with a small amount of gypsum (calcium sulfate) in a finish grinding mill to provide a fine, homogeneous powdery product known as Portland cement. Due to the extreme hardness of the clinkers, a large amount of energy is required to properly mill them into a suitable powder form. Energy requirements for finish grinding in a ball-mill can vary from about 40 to 80 kWh/ton and from 20-40 kWh/ton in a vertical roller mill depending upon the nature of the clinker. Several materials such as glycols, alkanolamines, aromatic acetates, etc., have been shown to reduce the amount of energy required and thereby improve the efficiency of the grinding of the hard clinkers. These materials, commonly known as grinding aids (also referred to herein as "grinding agents"), are processing additives which are introduced into the mill in small dosages and interground with the clinker to attain a uniform powdery mixture. In addition to reducing grinding energy, the commonly used processing additives are frequently used to improve the ability of the powder to flow easily and reduce its tendency to form lumps during storage.

Clinker production involves the release of $CO_2$ from the calcination of limestone. It is estimated that for each ton of clinker produced, up to one ton of $CO_2$ is released to the atmosphere. The utilization of fillers such as limestone or clinker substitutes such as granulated blast furnace slags, natural or artificial pozzolans, pulverized fuel ash, and the like, for a portion of the clinker allow a reduction on the emitted $CO_2$ levels per ton of finished cement. As used herein, the term filler refers to an inert material that has no later age strength enhancing attributes; the term "clinker substitute" refers to a material that may contribute to long term compressive strength enhancement beyond 28 days. The addition of these fillers or clinker substitutes to form "blended cements" is limited in practice by the fact that such addition usually results in a diminution in the physical strength properties of the resultant cement. For example, when a filler, such as limestone, is blended in amounts greater than 5%, the resultant cement exhibits a marked reduction in strength, particularly with respect to the strength attained after 28 days of moist curing (28-day strength). As used herein, the term "blended cements" refers to hydraulic cement compositions containing between 2 and 90%, more conventionally between 5 and 70%, fillers or clinker substitute materials.

As used herein, the term "fine aggregate" refers to particulate material used in construction whose size is less than 4.75 mm. The term "coarse aggregate" refers to particulate material used in construction that is larger than about 2/16 inch.

In a first example embodiment, the present invention is a method of making a cement composition. The method comprises grinding a cement clinker and a strength-enhancing agent, thereby producing a hydraulic cementitious powder.

In a first aspect of the first example embodiment, the strength-enhancing agent is present in the hydraulic cementitious powder in an amount of from 0.001% to 0.09% based on dry weight of the hydraulic cementitious powder. The strength-enhancing agent is a compound represented by the following structural formula:

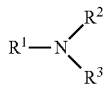

wherein $R^1$ is $(C_1\text{-}C_4)$alkyl-OH; and $R^2$ and $R^3$, each independently, is $(C_0\text{-}C_3)$alkyl-COOR*, wherein R* is H, Na$^+$, and K$^+$. In an example embodiment, R* is Na$^+$, K$^+$, or ½ Ca$^{++}$.

In a second aspect of the first example embodiment, the method of the first example embodiment further includes adding to the cement clinker at least one supplemental cementitious material selected from the group consisting of: fly ash, granulated blast furnace slag, limestone, calcined clay, natural pozzolans and artificial pozzolans.

In a third aspect of the first example embodiment, the cement clinker includes $C_3A$ in the amount of 0.3% to 9.0%, for example, 0.3% to 7.0% based on dry weight of cement clinker. The content of the total aluminate phase ($C_3A$) can be determined by quantitative X-ray diffraction using the Rietveld refinement method.

In a fourth aspect of the first example embodiment, the method further includes grinding with the strength enhancement agent and the cement clinker at least one supplemental component selected from a grinding aid, a set retarding agent, or a set accelerating agent.

In a fifth aspect of the first example embodiment, the method is as described above with respect to the first through the fourth aspects of the first example embodiments, further comprising grinding with the strength enhancement agent and the cement clinker at least one grinding aid. In various aspects, the strength enhancement agent is present in the amount of from 0.001% to 0.03% based on dry weight of the hydraulic cementitious powder, and the at least one grinding aid is added in the amount of from 0.001% to 0.06% based on dry weight of the hydraulic cementitious powder. In one aspect, the strength enhancement agent is present in the amount of from 0.001% to 0.03% based on dry weight of the hydraulic cementitious powder, and the at least one grinding aid is added in the amount of from 0.001% to 0.1% based on dry weight of the hydraulic cementitious powder.

In a sixth aspect of the first example embodiment, the method is as described above with respect to the first through the fourth aspects of the first example embodiments, further comprising grinding with the strength enhancement agent and the cement clinker at least one grinding aid and a set retarding agent. In various aspects, the strength enhancement agent is present in the amount of 0.001-0.03% based on dry weight of the hydraulic cementitious powder; the at least one grinding aid is added in the amount of from 0.001% to 0.06% based on dry weight of the hydraulic cementitious powder; the set retarding agent is added in the amount of 0.001-0.03% based on dry weight of the hydraulic cementitious powder. In other aspects, the strength enhancement agent is present in the amount of 0.001-0.03% based on dry weight of the hydraulic cementitious powder; the at least one grinding aid is added in the amount of from 0.001% to 0.1% based on dry weight of the hydraulic cementitious powder; the set retarding agent is added in the amount of 0.001-0.03% based on dry weight of the hydraulic cementitious powder.

In a seventh aspect of the first example embodiment, the method is as described above with respect to the first through the fourth aspects of the first example embodiments, further comprising grinding with the strength enhancement agent and the cement clinker at least one grinding aid and a set accelerating agent. In various aspects, the strength enhancement agent is present in the amount of from 0.001% to 0.03% based on dry weight of the hydraulic cementitious powder, the at least one grinding aid is added in the amount of from 0.001 to 0.06% based on dry weight of the hydraulic cementitious powder, the set accelerating agent is added in the amount of from 0.001% to 0.2% based on dry weight of the hydraulic cementitious powder. In other aspects, the strength enhancement agent is present in the amount of from 0.001% to 0.03% based on dry weight of the hydraulic cementitious powder, the at least one grinding aid is added in the amount of from 0.001 to 0.1% based on dry weight of the hydraulic cementitious powder, the set accelerating agent is added in the amount of 0.001% to 0.2% based on dry weight of the hydraulic cementitious powder.

In an eighth aspect of the first example embodiment, the method is as described above with respect to the first through the fourth aspects of the first example embodiments, further comprising grinding with the strength enhancement agent and the cement clinker at least one grinding aid, a set retarding agent, and a set accelerating agent. In various aspects, the strength enhancement agent is present in the amount of from 0.001% to 0.03% based on dry weight of the hydraulic cementitious powder, the at least one grinding aid is added in the amount of from 0.001% to 0.06% based on dry weight of the hydraulic cementitious powder, the set retarding agent is added in the amount of from 0.001% to 0.03% based on dry weight of the hydraulic cementitious powder, and the set accelerating agent is added in the amount of 0.001% to 0.2% based on dry weight of the hydraulic cementitious powder. In other aspects, the strength enhancement agent is present in the amount of from 0.001% to 0.03% based on dry weight of the hydraulic cementitious powder, the at least one grinding aid is added in the amount of from 0.001% to 0.1% based on dry weight of the hydraulic cementitious powder, the set retarding agent is added in the amount of from 0.001% to 0.03% based on dry weight of the hydraulic cementitious powder, and the set accelerating agent is added in the amount of 0.001% to 0.2% based on dry weight of the hydraulic cementitious powder.

In a ninth aspect of the first example embodiment, the method is as described above with respect to any of the first through eighth aspects, and further the strength enhancing agent is N-(2-hydroxyethyl)iminodiacetic acid (EDG) or a salt thereof (e.g. sodium, potassium).

In a tenth aspect of the first example embodiment, the method is as described above with respect to any of the fourth through ninth aspects, and further the grinding aid is one or more of a glycol (e.g., diethylene glycol, polyethylene glycol, monopropylene glycol, dipropylene glycol, tripropylene glycol, tetra propylene glycol), glycerin, a C1-C6 alkanolamine (e.g., TEA, DEIPA, and TIPA), acetic acid or an acetic acid salt (e.g., sodium acetate).

In an eleventh aspect of the first example embodiment, the method is as described above with respect to the fourth through sixth and eighth and ninth aspects, and further the set retarding agent is one or more of a gluconate salt (e.g. sodium gluconate), a molasses, sucrose, or a corn syrup.

In a twelfth aspect of the first example embodiment, the method is as described above with respect to the fourth, fifth, seventh, eighth, and ninth aspects, and further the set accelerating agent is one or more of a thiocyanate salt (e.g. sodium, potassium, calcium) or a chloride salt (sodium, potassium, calcium).

In a thirteenth aspect of the first example embodiment, the method is as described above with respect to the fourth embodiment, and further the strength enhancing agent is EDG or a salt thereof (e.g. sodium, potassium), the grinding aid is the glycol (e.g., diethylene glycol, DEG), the set retarding agent is sodium gluconate, and the set accelerating agent is sodium thiocyanate.

In a fourteenth aspect of the first example embodiment, the method is as described above with respect to any of the aspects of the first example embodiment, further including grinding the cement clinker and the strength-enhancing agent with an alkali sulfate (e.g., sodium sulfate). In an additional aspect of the first example embodiment, the method is as described above with respect to any of the aspects of the first example embodiment, further including grinding the cement clinker and the strength-enhancing agent with an alkali sulfate and/or an alkali carbonate (e.g., sodium sulfate, sodium carbonate, sodium bicarbonate).

In a fifteenth aspect of the first example embodiment, the strength-enhancing agent is made by a process comprising: reacting a monohaloacetic acid chosen from monochloroacetic acid and monobromoacetic acid, or a salt thereof, with a alkanolamine chosen from ethanolamine, isopropanolamine, and isobutanolamine under alkaline conditions to generate the strength-enhancing agent represented by the structural formula

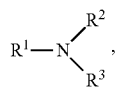

wherein: $R^1$ is $(C_1-C_4)$alkyl-OH; and $R^2$ and $R^3$, each independently, represent —$CH_2COO^-R^*$, where $R^*$ is defined above with respect to the first aspect of the first example embodiment. For example, the haloacetic acid or its salt is chloroacetic acid or its salt, and $R^1$ is —$CH_2CH_2OH$.

In any of aspects of the first example embodiment, the content of $Na_2O$ equivalent in the hydraulic cementitious material is less than or equal to 0.7% by weight of the hydraulic cementitious powder. The content of $Na_2O$ equivalents in cement is determined as follows, in weight percent: % $Na_2O$ equivalent=% $Na_2O$+0.658*% $K_2O$, where the values of % $Na_2O$ and % $K_2O$ in cement can be determined using either X-ray fluorescence (XRF) or inductively coupled plasma mass spectroscopy (ICP-MS).

In a second example embodiment, the present invention is a composition prepared by the method of any one aspect of the first example embodiment.

In a third example embodiment, the present invention is an additive composition, comprising (A) a strength-enhancing agent represented by the following structural formula:

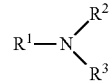

and (B) at least one grinding aid selected from one or more of a glycol (e.g., diethylene glycol, polyethylene glycol, monopropylene glycol, dipropylene glycol, tripropylene glycol, tetra propylene glycol), glycerin, or acetic acid or a salt thereof, wherein the additive composition is a liquid.

The strength-enhancing agent of the third example embodiment is described above with respect to the first example embodiment.

In a first aspect of the third example embodiment, the weight ratio of the strength enhancing agent to the grinding aid in the additive composition is from 1:9 to 9:1. In another aspect of the third example embodiment, the weight ratio of the strength enhancing agent to the grinding aid in the additive composition is from 1:19 to 19:1.

In the second aspect of the third example embodiment, the additive composition is as described above with respect to any of the aspects of the second example embodiment, further comprising a set retarding agent, a set accelerating agent, or a mixture thereof.

In the third aspect of the third example embodiment, the additive composition is as described above with respect to any of the aspects of the second example embodiment, and further the strength enhancing agent is N-(2-hydroxyethyl)iminodiacetic acid (EDG) or a salt thereof (e.g. sodium, potassium).

In the fourth aspect of the third example embodiment, the additive composition is as described above with respect to any of the aspects of the second example embodiment, and further the at least one grinding aid is diethylene glycol.

In the fifth aspect of the third example embodiment, the additive composition is as described above with respect to any of the aspects of the second example embodiment, further comprising sodium gluconate or sodium thiocyanate.

In the sixth aspect of the third example embodiment, the additive composition is as described above with respect to any of the aspects of the second example embodiment, further comprising an alkali sulfate (e.g., sodium sulfate). In the another aspect of the third example embodiment, the additive composition is as described above with respect to any of the aspects of the second example embodiment, further comprising an alkali sulfate and/or an alkali carbonate (e.g., sodium sulfate, sodium carbonate, sodium bicarbonate).

In a fourth example embodiment, the present invention is a cementitious composition comprising a cementitious binder obtained by grinding a cement clinker with the additive composition of any aspect of the third example embodiment.

In a fifth example embodiment, the present invention is a cement composition, comprising a hydraulic cementitious powder, said hydraulic cementitious powder including tricalcium aluminate ($C_3A$) in an amount of from 0.3% to 9.0% based on dry weight of the hydraulic cementitious powder; a strength-enhancing agent, said strength-enhancing agent being present in an amount of from 0.001% to 0.09% based on dry weight of the hydraulic cementitious powder, and at least one grinding aid selected from a glycol (e.g., diethylene glycol, polyethylene glycol, monopropylene glycol, dipropylene glycol, tripropylene glycol, tetra propylene glycol), glycerin, or acetic acid or an acetate salt (e.g., sodium or potassium acetate).

The strength-enhancing agent of the fifth example embodiment is described above with respect to the first example embodiment.

In a sixth example embodiment, the present invention is an additive composition for use in grinding with a cement clinker, said composition comprising (A) a strength-enhancing agent and (B) at least one grinding aid selected from one or more of a glycol, glycerin, or acetic acid or an acetate salt, wherein the additive composition is a liquid. The strength-enhancing agent of the sixth example embodiment is described above with respect to the first example embodiment.

In a seventh example embodiment, the present invention is a mixture of a cement clinker and the additive composition of any aspect of the third example embodiment.

In an eighth example embodiment, the present invention is a method for making a strength-enhancing agent, comprising reacting a haloacetic acid chosen from one or more of a chloroacetic acid and a bromoacetic acid, or a salt thereof, with one or more alkanolamines of the structural formula (I)

(I)

under alkaline conditions, to generate the strength-enhancing agent represented by structural formula (II)

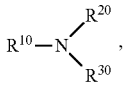

(II)

wherein each $R^{10}$ is independently chosen from H, ($C_1$-$C_4$)alkyl-OH, provided that in structural formula (I) at least one group $R^{10}$ is not H; $R^{20}$ is chosen from ($C_1$-$C_4$)alkyl-OH, and —$C(R^4)_2COO^-M^+$; and $R^{30}$ is —$C(R^4)_2COO^-M^+$; each $R^4$ is independently chosen from hydrogen, Br, and Cl; and $M^+$ is $H^+$, $Na^+$, $K^+$, or ½ $Ca^{++}$.

In a first aspect of the eighth example embodiment, the chloroacetic acid is monochloracetic acid or a salt thereof; the compound represented by structural formula (I) is ethanolamine represented by the following structural formula HO—$CH_2$—$CH_2$—$NH_2$; and the strength-enhancing agent represented by structural formula (II) is sodium ethanoldiglycine ($Na_2$-EDG)

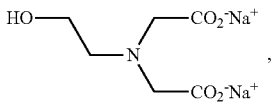

wherein the monochloracetic acid or a salt thereof and the ethanolamine are reacted in the presence of sodium hydroxide at above room temperature.

In another aspect, the monochloracetic acid or a salt thereof and the ethanolamine are reacted in the presence of sodium hydroxide at any temperature at which the reaction process can be carried out, for example at or above room temperature. The temperature of reaction can be chosen depending on a particular condition to reduce the process of the present invention to practice. For example, when the higher productivity of the process is desirable, higher temperature, such as at above the room temperature can be chosen, whereas the higher EDG content is desired, the lower temperature, such as at the room temperature or below, is preferably applied. The temperature of the manufacturing process is suitably controlled depending on the preferences of the product and the production process. It is noted that the neutralization of chloroacetic acid with alkali generates heat that can either be used or controlled as the reaction temperature chosen above.

In a ninth example embodiment, the present invention is a strength-enhancing agent made by the methods according to the any aspect of the eighth example embodiment. It is contemplated that the strength enhancing agent according to the ninth example embodiment can be used in the methods and compositions according to any aspects of the first to the seventh example embodiments.

In a tenth example embodiment, the present invention is an additive composition, comprising a first component; and a cement additive component, wherein the cement additive component is one or more agent chosen from a glycol, glycerol, acetic acid or a salt thereof, an alkanolamine, an amine, a carbohydrate, a water-reducing additive, an air-entraining agent, a chloride salt, a nitrite salt, a nitrate salt, and a thiocyanate salt; and the first component is prepared according to the eighth example embodiment and any aspect thereof.

In a first aspect of the tenth example embodiment, the additive composition is in liquid form.

In an eleventh example embodiment, the present invention is a concrete composition, comprising the additive composition according to the tenth example embodiment and any aspect thereof; cement; a fine aggregate; a coarse aggregate, and at least one supplemental cementitious material chosen from fly ash, granulated blast furnace slag, limestone, calcined clay, natural pozzolan, and artificial pozzolan.

In a twelfth example embodiment, the present invention is a method of making a concrete composition, comprising preparing a reaction mixture according to the fifteenth aspect of the first example embodiment or the eighth example embodiment and any aspect thereof, adding the reaction mixture without purification to a cement clinker; and grinding the cement clinker and the reaction mixture, thereby producing a hydraulic cementitious powder.

It has now been discovered that, unlike traditional strength-enhancers (e.g., TEA, DEIPA, EDIPA, TIPA), the strength-enhancing agents described herein (e.g., ethanol diglycine in acid or salt form) do not involve increasing the solubility of iron in the hydrated cement, and, therefore do not cause yellow staining on finished products.

Other strength enhancing agents, such as TEA, DEIPA, EDIPA and TIPA, while improving strength, tend to increase the amount of air entrained in the cement. In some instances, adding such agents can lead to set cement compositions with large porosity and poor finished surfaces. Although incorporation of air detraining agents (ADA), such as those illustrated in U.S. Pat. No. 5,156,679, incorporated herein by reference in its entirety, enable reduction in the air content, the formation and release of bubbles from the cement compositions cannot be eliminated.

The amino acid derivatives described herein can simultaneously improve early strength, without entraining large air voids. This is desirable as it can lead to cement compositions, such as Portland cement concrete, with lower porosities and better finished surfaces.

A particular advantage of the additive of the invention is that it may be either interground or intermixed with the cement. As used herein, the terms "interground" and "intermixed" refer to the particular stage of the cement processing in which the amino acid derivatives described herein, for example EDG, are added. They may be added to the clinker during the finish grinding stage and thus interground to help reduce the energy requirements and provide a uniform free flowing cement powder with reduced tendency to form lumps during storage. It is also possible to add the subject additives as an admixture to powdered cement either prior to, in conjunction with, or after the addition of water when causing the hydraulic setting of the cement. Further, the amino acid derivatives of this invention may be supplied in a pure concentrated form, or diluted in aqueous or organic solvents, and may also be used in combination with other chemical admixtures, including but not limited to: accelerating admixtures, air entrainers, air detrainers, water-reducing admixtures, retarding admixtures (as defined in ASTM C494) and the like, and mixtures thereof. The additive according to the invention may be used with ordinary cement or with blended cements.

Example embodiments of the invention, including the strength-enhancing agents made by reacting a haloacetic acid or a salt thereof with an alkanolamine, provide additive compositions for facilitating cement grinding, and provide early cement strength enhancement, without generating the attendant disadvantages of producing hazardous products as would be expected from current commercial processes that involve monoethanolamine, formaldehyde, and sodium cyanide starting materials.

One skilled in the art, using the preceding detailed description, can utilize the present invention to its fullest extent. The following examples are provided to illustrate the invention, but should not be construed as limiting the invention in any way except as indicated in the appended claims. All parts and percentages are by weight unless otherwise indicated and additives are expressed as percent active ingredient as solids based weight of dry cement (% s/c). Compressive strengths of the cement samples were determined in accordance with EN method 196-1. Examples 1 through 19, below were prepared using commercially available cements and clinkers.

In a thirteenth example embodiment, the present invention is a method for grinding a solid in a vertical roller mill (VRM).

Vertical Roller Mills ("VRMs") work by grinding materials using rollers or rotating members (e.g., 2-8 in number) that press downwards (typically under hydraulic or pneumatic force) upon a rotating table. The table is rotatable about a vertical axis and is generally circular in nature. The table may have flat or annular channels where the particles are ground by the downward pressure of the rollers.

Materials to be ground (e.g., cement clinker) are dropped, via a hopper or sluice, onto the center of the circular table, which rotates and allows the material to be contacted and crushed by the rollers. The particles move outwards and beyond the circumferential edge of the rotating table by centrifugal force. The particles are then carried by a flow of air to a device for separating the particles based on size ("classifier") located above the table. If classified as being too large to pass through the classifier the particles are returned to the center of the table; or, if fine enough to pass through the classifier, they are removed from the grinding mill.

VRMs provide advantages over ball mills, such as lower energy consumption (e.g., 30%-50% more efficient), smaller footprint, faster setup, greater product outputs, and often more control over particle size distribution, however, milling instability can be problematic. For example, it is current practice to spray water onto the grinding bed (i.e., the layer of material passing under the grinding rollers) of the VRM to stabilize the mill. When the grinding process of VRMs begins to de-stabilize, the VRM structure can begin to shake and create vibrations that can be felt in adjacent buildings, even considerable distances from the mill. This vibration can damage the VRM, so the mill will be shut down if the vibrations exceed a preset limit. While adding water is effective at reducing vibrations, it can pre-hydrate the cement, which has a negative effect on its properties, including but not limited to a decrease in strength. Thus, there is a need for chemicals that can stabilize the mill, as well as permit less water spray use.

The following patents and published patent applications, the contents of which are hereby incorporated by reference, describe VRMs in detail: U.S. Pat. No. 4,715,544 (1987); U.S. Pat. No. 7,028,934 (2006); and WO2016196456A1 (Published 2016).

The method comprises grinding at least one solid in the presence of a grinding stabilizing additive, wherein the grinding stabilizing additive comprises an alkanol amino acid compound or a disodium or dipotassium salt thereof having the structural formula

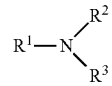

wherein $R^1$ is $(C_1\text{-}C_4)$alkyl-OH; and $R^2$ and $R^3$, each independently, is $(C_0\text{-}C_3)$alkyl-COOR*, wherein R* is H, $Na^+$, $K^+$, or ½ $Ca^{++}$.

In various aspects of the thirteenth embodiment, the method includes providing a vertical roller mill having a table with an upper surface rotatable around a vertical axis for receiving material particles to be ground into finer particles, and at least two rollers for rolling contact with the upper surface and grinding the material particles. The method can also include introducing onto the upper surface, at or near the vertical axis of rotation, a solid material to be ground (e.g., (a) cement clinker, gypsum, limestone, or a mixture thereof, (b) a supplemental cementitious material, (c) or mixture of (a) and (b)); and introducing to the solid material to be ground, either before it enters the mill or while it is on the grinding table, a grinding stabilizing additive, described below. The solid is typically ground between the rollers and the upper table surface.

Typically, the rollers are hydraulically or pneumatically actuated to exert downward pressure on the upper table surface. The ground solids are removed from the edge of the rotating table and circulated by air flow or vacuum suction to a classifier. The classifier removes the solids from the grinding operation (if they have achieved sufficient fineness)

or returns the solids to the upper table surface for further grinding (if determined to have insufficient fineness).

Classifiers operate by rotating particles within an air stream and heavier ones are flung outward while the lighter ones move through the classifier and are removed from the processing area.

In a first aspect of the thirteenth embodiment, the solid comprises one or more of a cement clinker, gypsum, limestone, a supplemental cementitious matter, or a mixture thereof.

In a second aspect of the thirteenth embodiment, the grinding stabilizing additive comprises ethanol diglycine (EDG), isopropanol diglycine (IPDG), disodium EDG, dipotassium EDG, disodium IPDG, dipotassium IPDG or mixture thereof, and is present in an amount of 0.001-0.04% (for example, 0.005%-0.02%) based on dry weight of solid being ground.

In a third aspect of the thirteenth embodiment, the method further includes grinding the solid in the presence of at least one supplemental additive chosen from: (A) a grinding agent chosen from a glycol (e.g., diethylene glycol, tripropylene glycol) or glycerin, in the amount of 0.001% to 0.1% based on dry weight of the solid being ground; (B) a supplemental agent chosen from a tertiary alkanolamine or an acetate salt thereof, in the amount of 0.001-0.1% based on dry weight of the solid being ground; (C) a set retarding agent chosen from gluconate salt, a molasses, sucrose, or a corn syrup, in the amount of 0.001% to 0.06% based on dry weight of the solid being ground; (D) a set accelerating agent chosen from a thiocyanate salt, chloride salt, or mixture thereof, in the amount of 0.001% to 0.2% based on dry weight of the solid being ground; (E) a dispersing agent chosen from sodium acetate, potassium acetate, in the amount of 0.005% to 0.1% based on dry weight of the solid being ground or (F) mixture thereof.

In an example embodiment of the third aspect of the thirteenth embodiment, the supplemental agent is chosen from triethanolamine ("TEA"), diethanolpropanolamine ("DEIPA"), ethanoldiisopropanolamine ("EDIPA"), triisopropanolamine ("TIPA"), the acetate of any of the foregoing (e.g., TEA acetate, DEIPA acetate, EDIPA acetate, TIPA acetate), or a mixture of any of the foregoing.

In a fourth aspect of the thirteenth embodiment, the grinding stabilizing additive comprises EDG, IPDG, disodium EDG, dipotassium EDG, disodium IPDG, dipotassium IPDG or a mixture thereof; and the method further including grinding the solid in the presence of at least one agent chosen from: (A) at least one of DEIPA, EDIPA, TIPA, TEA, DEIPA acetate, EDIPA acetate, TIPA acetate, TEA acetate, or mixture thereof; and (B) sodium acetate, potassium acetate, or mixture thereof; or a mixture of (A) and (B).

In various example embodiments of the fourth aspect of the thirteenth embodiment, any combination of the agents listed under (A) and (B) above can be used. For example, the following combinations can be used: EDG and sodium acetate; EDG and DEIPA; EDG and TIPA; EDG, DEIPA, and sodium acetate; EDG, TIPA, and sodium acetate; IPDG and sodium acetate; IPDG and DEIPA; IPDG and TIPA; IPDG, DEIPA, and sodium acetate, EPDG, TIPA, and sodium acetate.

In a fifth aspect of the thirteenth embodiment, the solid includes a supplemental cementitious material chosen from fly ash, granulated blast furnace slag, limestone, calcined clay, natural pozzolan, and artificial pozzolan.

In a sixth aspect of the thirteenth embodiment, the solid includes a cement clinker, and the method further including grinding the solid in the presence of at least two agents chosen from a grinding agent, a set retarding agent, a set accelerating agent, or a dispersing agent.

In a seventh aspect of the thirteenth embodiment, the solid includes a cement clinker; and the method including grinding the solid in the presence of a grinding agent. In example embodiments of the seventh aspect, the grinding stabilizing additive is present in the amount of from 0.001% to 0.04% based on dry weight of the solid being ground, and the grinding agent is present in the amount of from 0.001% to 0.10% (for example, 0.005% to 0.02%) based on dry weight of the solid being ground.

In an eighth aspect of the thirteenth embodiment, the solid includes a cement clinker, and the method further including grinding the solid in the presence of a grinding agent, and a supplemental agent chosen from a tertiary alkanolamine or an acetate salt thereof. In example embodiments of the eighth aspect, the grinding stabilizing additive is present in the amount of 0.001-0.04% based on dry weight of the solid being ground; the grinding agent is present in the amount of from 0.001% to 0.10% based on dry weight of the solid being ground; and the supplemental agent is present in the amount of 0.001-0.04% based on dry weight of the solid being ground.

In a ninth aspect of the thirteenth embodiment, the solid includes a cement clinker, and the method further including grinding the solid in the presence of a grinding agent and a set retarding agent. In example embodiments of the ninth aspect, the grinding stabilizing additive is present in the amount of from 0.001% to 0.04% based on dry weight of the solid being ground, the grinding agent is present in the amount of from 0.001 to 0.1% based on dry weight of the solid being ground, and the set retarding agent is present in the amount of from 0.001% to 0.03% based on dry weight of the solid being ground.

In a tenth aspect of the thirteenth embodiment the solid includes a cement clinker, the method further including grinding the solid in the presence of a grinding agent and a set accelerating agent. In example embodiments of the tenth aspect, the grinding stabilizing additive is present in the amount of from 0.001% to 0.04% based on dry weight of the solid being ground, the grinding agent is present in the amount of from 0.001% to 0.1% based on dry weight of the solid being ground, and the set accelerating agent is present in the amount of from 0.001% to 0.2% based on dry weight of the solid being ground.

In an eleventh aspect of the thirteenth embodiment, the solid includes a cement clinker, and the method further including grinding the solid in the presence of a grinding agent and a dispersing agent. In example embodiments of the eleventh aspect, the grinding stabilizing additive is present in the amount of from 0.001% to 0.04% based on dry weight of the solid being ground, the grinding agent is present in the amount of from 0.001% to 0.1% based on dry weight of the solid being ground, and the dispersing agent is present in the amount of 0.005% to 0.1% based on dry weight of the solid being ground.

In a twelfth aspect of the thirteenth embodiment, the method further including grinding the solid in the presence of a grinding agent chosen from diethylene glycol, dipropylene glycol, tripropylene glycol, tetrapropylene glycol, glycerin, acetic acid or its salt, or a mixture thereof.

In a thirteenth aspect of the thirteenth embodiment, the method further including grinding the solid in the presence of a set retarding agent chosen from a gluconate salt, a molasses, sucrose, corn syrup, or mixture thereof.

In a fourteenth aspect of the thirteenth embodiment, the method further including grinding the solid in the presence of a set accelerating agent chosen from a thiocyanate salt, a chloride salt, or mixture thereof.

In a fifteenth aspect of the thirteenth embodiment, the grinding stabilizing additive is (a) EDG, (b) IPDG, (c) or a mixture thereof, or (d) a salt of any of (a), (b), or (c); and the method further including grinding the solid in the presence of a glycol, sodium gluconate, and a set accelerating agent chosen from sodium chloride or sodium thiocyanate.

In a sixteenth aspect of the thirteenth embodiment, the grinding stabilizing additive is EDG or an EDG salt.

In a seventeenth aspect of the thirteenth embodiment, the grinding stabilizing additive is IPDG or an IPDG salt.

In an eighteenth aspect of the thirteenth embodiment, the solid is a cement clinker, and the method further including grinding the cement clinker with an alkali sulfate.

In a fourteenth example embodiment, the present invention is a method of any of the first $1^{st}$ through $17^{th}$ aspects of the $13^{th}$ embodiment, wherein the grinding stabilizing additive is made by a process, comprising: reacting a haloacetic acid chosen from monochloroacetic acid and monobromoacetic acid, or a salt thereof, with an alkanolamine chosen from ethanolamine, isopropanolamine, and isobutanolamine under alkaline conditions to generate the grinding stabilizing additive represented by the structural formula

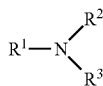

wherein $R^1$ is $(C_1-C_4)$alkyl-OH; $R^2$ and $R^3$, each independently, represent —$CH_2COO^-R^*$, and $R^*$ is H, $Na^+$, $K^+$, or ½ $Ca^{++}$.

In one aspect of the $14^{th}$ embodiment, the haloacetic acid or its salt is chloroacetic acid or its salt, and $R^1$ is —$CH_2CH_2OH$ (ethanol), —$CH_2$—$CH(CH_3)$—OH (isopropanol), or mixture thereof.

In an additional aspects of the $13^{th}$ and the $14^{th}$ embodiments, the grinding stabilizing additive is disodium ethanol-diglycine or disodium isopropanol-diglycine represented by the structural formula

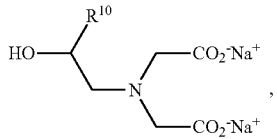

wherein $R^{10}$ is H or —$CH_3$.

In a further aspect of the $13^{th}$ and the $14^{th}$ embodiment, the grinding stabilizing additive is a liquid.

In a $15^{th}$ example embodiment, the present invention is an additive composition for grinding, comprising: (a) EDG, IPDG, or mixture thereof; (b) at least one alkanolamine chosen from DEIPA, EDIPA, TIPA, TEA, THEED, DEIPA acetate, EDIPA acetate, TIPA acetate, TEA acetate, THEED acetate, or a mixture thereof; (c) sodium acetate; or a mixture of any of the foregoing.

In one aspect of the $15^{th}$ embodiment, the additive composition comprising components (a) and (c).

In various example embodiments of the $15^{th}$ embodiment, any combination of the agents listed under (a), (b), and (c) above can be used. For example, the following combinations can be used: EDG and sodium acetate; EDG and DEIPA; EDG and TIPA; EDG, DEIPA, and sodium acetate; EDG, TIPA, and sodium acetate; IPDG and sodium acetate; IPDG and DEIPA; IPDG and TIPA; IPDG, DEIPA, and sodium acetate, EPDG, TIPA, and sodium acetate.

In a further aspect of the $13^{th}$ and the $14^{th}$ embodiments, the grinding stabilizing additive comprises EDG, IPDG, or mixtures of the foregoing diglycines; diethylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In a $16^{th}$ example embodiment, the present invention is an additive composition for grinding, comprising EDG or IPDG, or a mixtures of the forgoing diglycines; diethylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In a $17^{th}$ example embodiment, the present invention is an additive composition for grinding, comprising EDG, IPDG, or a mixture of the forgoing diglycines; tripropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In an $18^{th}$ example embodiment, the present invention is an additive composition for grinding, comprising EDG, IPDG, or a mixture of the foregoing diglycines; at least one glycols chosen from diethylene glycol, tripropylene glycol, and tetrapropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In a $19^{th}$ example embodiment, the present invention is an additive composition for grinding, comprising at least one glycol chosen from diethylene glycol, tripropylene glycol, and tetrapropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In a $20^{th}$ example embodiment, the present invention is an additive composition for grinding, comprising tripropylene glycol and at least one alkanolamine chosen from TEA, DEIPA, EDIPA, TIPA, THEED, the acetate of any of the foregoing alkanolamines, or a mixture of any of the foregoing alkanolamines and acetates thereof.

In a further aspect of the $13^{th}$ and the $14^{th}$ embodiments, the grinding stabilizing additive comprises EDG, IPDG, or a mixture of the forgoing diglycines; tripropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In yet further aspect of the $13^{th}$ and the $14^{th}$ embodiments, the grinding stabilizing additive comprises EDG, IPDG, or a mixture of the foregoing diglycines; at least one glycol chosen from diethylene glycol, tripropylene glycol, and tetrapropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

In another aspect of the $13^{th}$ and the $14^{th}$ embodiments, the grinding stabilizing additive comprises at least one glycol chosen from diethylene glycol, tripropylene glycol, and tetrapropylene glycol and at least one alkanolamine chosen from TEA, DEIPA, EDIPA, TIPA, THEED, the acetate of any of the foregoing alkanolamines, or a mixture of any of the foregoing alkanolamines and acetates thereof.

In another aspect of the 13th and the 14th embodiments, the grinding stabilizing additive comprises tripropylene glycol and at least one alkanolamine chosen from TEA, DEIPA, EDIPA, TIPA, THEED, the acetate of any of the foregoing alkanolamines, or a mixture of any of the foregoing alkanolamines and acetates thereof.

In a 21st example embodiment, the present invention is an additive composition for grinding, comprising tripropylene glycol (TPG); at least one alkanolamine chosen from TEA, DEIPA, EDIPA, TIPA, THEED, the acetate of any of the foregoing alkanolamines, or a mixture of any of the foregoing alkanolamines and acetates thereof; and, optionally, EDG.

In a further aspect of the 13th and the 14th embodiments, the grinding stabilizing additive comprises EDG; tripropylene glycol (TPG); and at least one alkanolamine chosen from TEA, DEIPA, EDIPA, TIPA, THEED, the acetate of any of the foregoing alkanolamines, or a mixture of any of the foregoing alkanolamines and acetates thereof.

EXEMPLIFICATION

Example 1: Ethanoldiglycine Disodium Salt ($Na_2$-EDG) Enhances Early Strength of Cements Table 1, presented in FIG. 4A and FIG. 4B, describes cement samples tested in this example.

A variety of cements (i.e. cementitious material) have been tested in mortars (i.e. the cement composition), and the impact of 0.02% $Na_2$-EDG by weight of the cementitious material on compressive strength has been assessed. The content of the total crystalline phases has been determined by quantitative X-ray diffraction using Rietveld refinement method. The content of sulfur element, expressed as $SO_3$, was determined by X-ray fluorescence (XRF). The total alkali content or the content of $Na_2O$ equivalent in cement is determined as follows, in weight percent: % $Na_2O$ equivalent=% $Na_2O$+0.658*% $K_2O$, where the values of % $Na_2O$ and % $K_2O$ in cement are determined using XRF. The description of the tested cements and the results of the compressive strength measurements are provided in Table 1, denoted alphabetically as Cement A to W (see FIGS. 4A and 4B).

Mortars were prepared following the EN 196-1 testing protocol, where 450 grams of cement are mixed with 225 grams of water and 1350 grams of a graded sand. Additives were added to the water before mortar mixing. The mortar prepared this way was used to cast 40×40×160 mm prismatic specimens that were submitted to compression until rupture after 1 day of curing in a moist room at 20.6° C. and more than 95% relative humidity. The rupture load was converted to compressive strength (in MPa).

The results of this experiment indicate that $Na_2$-EDG can increase the strength of cements.

To visualize the results, the value of percent early strength increase as a function of the $C_3A$ content was plotted. FIG. 1 represents such a plot for $Na_2$-EDG added at 0.02% by weight of the cementitious material.

Example 2: $Na_2$-EDG Enhances Early Strength

The performance of $Na_2$-EDG was compared to that of other additives—Na-glycine, sarcosine, and $Na_2$-EDTA—using Cement A.

The structures of these additives are reproduced below:

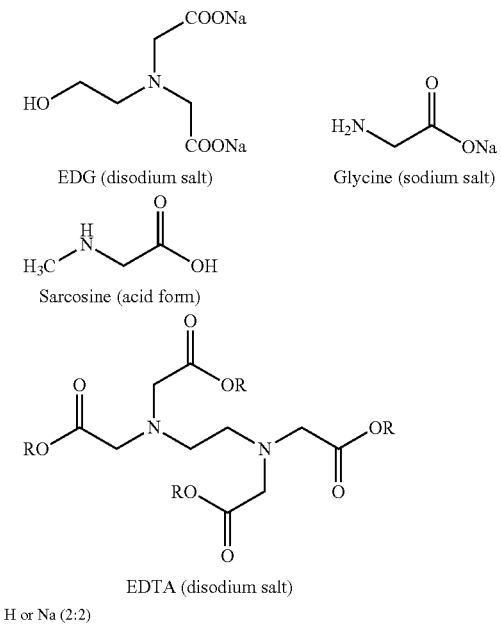

The mortars were prepared using Cement A as described above in Example 1. The additives (Sarcosine, glycine, sodium salt, EDTA, disodium salt, and EDG disodium salt) were added in varying amounts expressed as parts-per-million of the carboxylic groups (COO—), and the compressive strength of samples at Day 1 was measured. The results, presented as a plot of Day 1 compressive strength as a function of COO— content, are shown in FIG. 2A.

Figure 2A:
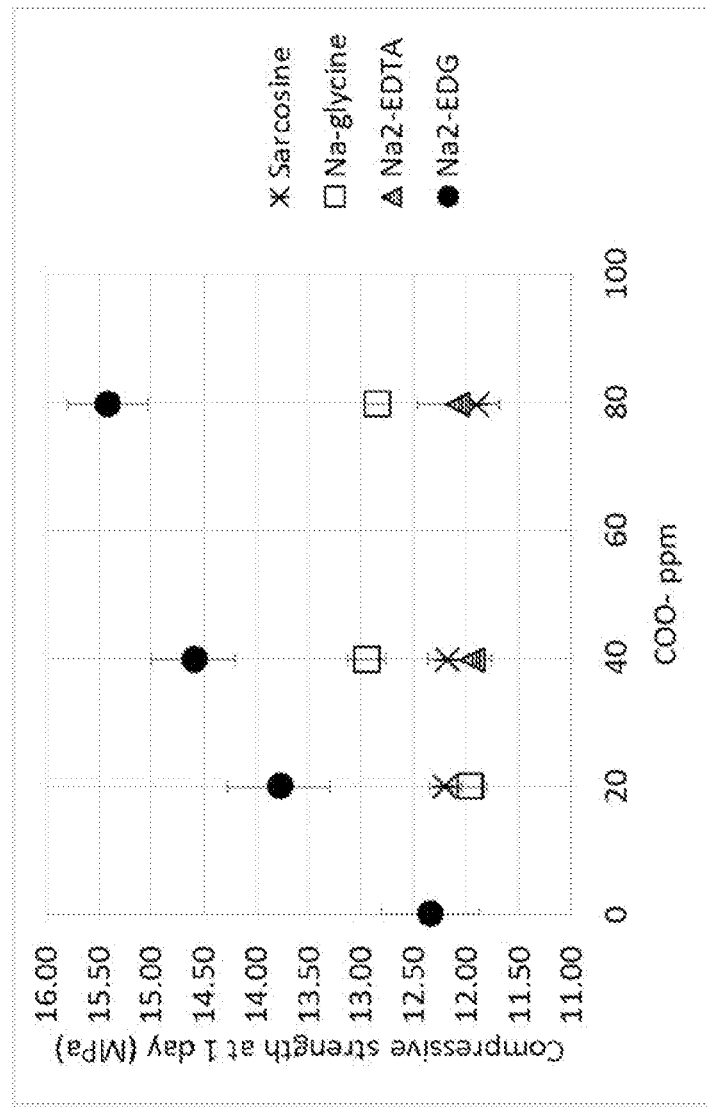
FIG. 2A is a plot of compressive strength (in MPa) of a mortar made with cement A sample at Day 1 post mortar preparation as a function of the carboxyl functionality (COO—) content (expressed in parts-per-million relative to cement weight). The carboxyl functionality is provided by the listed additives.

FIG. 2A shows that EDG is a superior enhancer of early strength when compared to the other additives.

The performance of EDG was further compared to that of bicine and TEA using Cement B. The structural formulas of bicine and TEA are reproduced below:

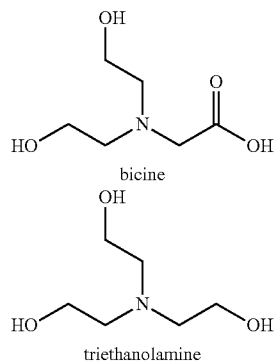

Mortars were prepared using Cement B as described above. The mortar mixes were used to prepare 40×40×160 mm prismatic specimens that were tested under compression load until rupture after 24 hours of storage at 20.6° C. and greater than 95% relative humidity.

Figure 2B:
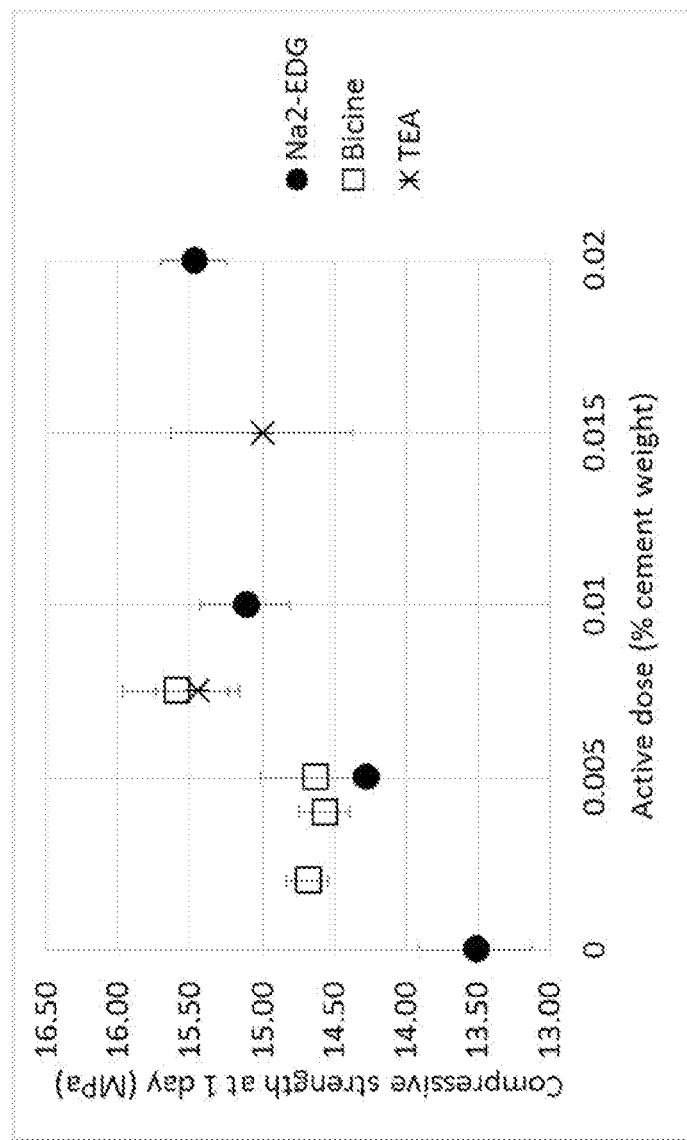
FIG. 2B is a plot of compressive strength (in MPa) of a a mortar made with cement B sample at Day 1 post mortar preparation as a function of the content of the additive (in weight percent).

FIG. 2B is a plot of Day 1 compressive strength (in MPa) of Cement B as a function of the content of the additive (in weight percent). FIG. 2B shows that 0.005%, 0.01% and 0.02% $Na_2$-EDG increased the 1-day strength of the cement by 0.8 MPa, 1.6 MPa, and 2.0 MPa, respectively. Bicine, added at 0.002% to 0.0075%, enhanced 1 day strength by 1.2 to 2.1 MPa, respectively. TEA added at 0.0075% and 0.015% enhanced 1 day strength by 1.9 MPa and 1.5 MPa, respectively. It is surprising that EDG had similar to superior performance to bicine and TEA, even though it contains two carboxyl groups.

Example 3: Na$_2$-EDG Improves Grinding Efficiency of Cements

The effect of Na$_2$-EDG additive on grinding efficiency of cementitious material was investigated in a laboratory scale ball mill. For this investigation, 3325 grams of a commercial clinker were ground in with 63.5 grams gypsum and 39.4 grams basanite (calcium sulfate hemi-hydrate) at 88-95° C. The grindings were periodically interrupted to evaluate the fineness of the cements using the Blaine air permeability apparatus, which allows assessing the specific surface area (SSA) of powders. Table 2, below, shows the Blaine SSA values for samples containing either no chemical additive or for samples containing 0.02% Na$_2$-EDG (% weight of solids on cement). In this experiment, 0.05% water (% of cement weight) was added to the control cementitious material (no chemical additive) to account for the presence of water in the EDG additive.

TABLE 2

Blaine specific surface area values of laboratory ground cements

| Additive | Dosage (% s/c) | Blaine SSA (cm$^2$/g) for each grinding time (minutes) | | | | | | |
|---|---|---|---|---|---|---|---|---|
| | | 120 | 150 | 210 | 250 | 295 | 325 | 347 |
| None | 0.00 | 2173 | n/a | 2474 | n/a | 2838 | n/a | 2958 |
| EDG | 0.02 | 2333 | 2562 | 2799 | 2893 | 3017 | 3050 | n/a | n/a: result not available

The data in Table 2 demonstrates that addition of Na$_2$-EDG increased the specific surface area of the ground material at all grinding times comparing to the sample with no chemical additives.

Figure 3:
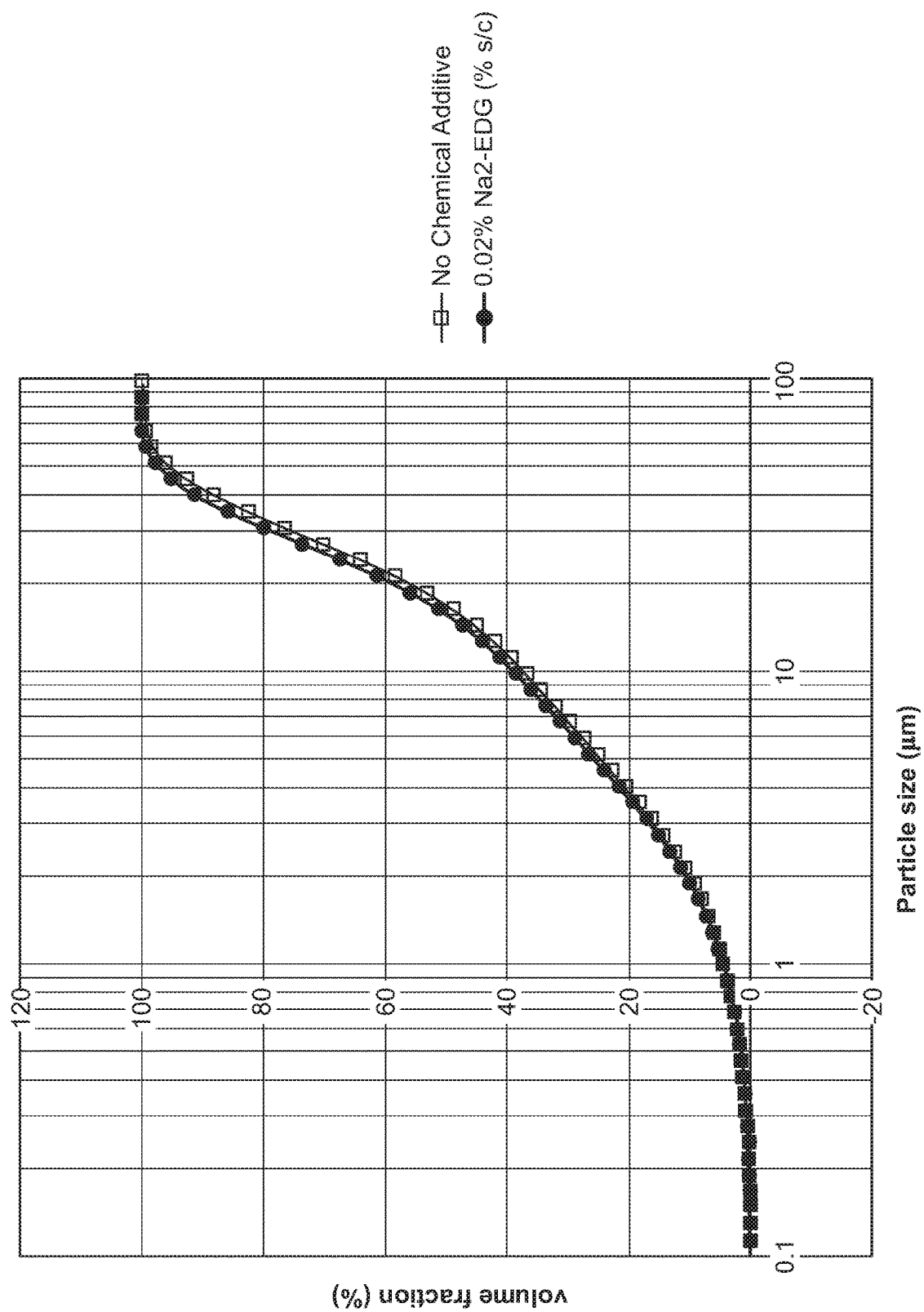
FIG. 3 is a plot of "volume fraction" of the particles in a ground cement sample as a function of particle size in micrometers. Filled circles indicate cement compositions that include 0.02% by weight $Na_2$-EDG additive; white squares—cement compositions without an additive.

The particle size distributions (PSD) of the sample of the cementitious material to which 0.02% by weight Na$_2$-EDG was added, ground for 325 minutes, and of the sample containing no chemical additives, ground for 347 minutes, was determined using laser diffraction. This technique measures the particle size distribution by measuring the angular variation in intensity of light scattered as a laser beam passes through the dispersed powders. The data is presented in FIG. 3, which is a plot of "percent volume fraction" as a function of particle size in micrometers (i.e. the curve indicates the percent of the particles by volume at a given size in the sample). The tests were performed in a Malvern Mastersize 3000 particle size analyzer coupled with an Aero S dry dispersion unit in 1-3 grams cement samples.

It is seen that, even though ground for less time than the sample with no chemical admixtures, the curve representing the EDG sample is slightly shifted to lower particle sizes, indicating a finer distribution as compared to the sample with no chemical additives.

Example 4: Formulations with EDG Provide Higher Early Strength

Table 3 shows the impact of Na$_2$-EDG and combinations of Na$_2$-EDG with sodium thiocyanate, sodium gluconate, and/or diethylene glycol on the early strength of mortars prepared according to the protocol described in Example 1. Cement I was used to prepare the mortars. Table 3 shows that the combination of Na$_2$-EDG with other components allow a further increase of 1-day strength.

TABLE 3

| EDG (% s/c) | NaSCN (% s/c) | Na-gluconate (% s/c) | DEG (% s/c) | 1 d % blank |
|---|---|---|---|---|
| 0 | 0 | 0 | 0 | 100.0% |
| 0.01 | 0 | 0 | 0 | 106.3% |
| 0.02 | 0 | 0 | 0 | 108.4% |
| 0.01 | 0.02 | 0.0075 | 0 | 111.3% |
| 0.02 | 0.04 | 0 | 0 | 113.2% |
| 0.02 | 0.04 | 0.015 | 0 | 122.1% |
| 0.01 | 0 | 0 | 0.03 | 103.6% |
| 0.02 | 0 | 0.015 | 0 | 103.4% |
| 0.0077 | 0.02 | 0.0039 | 0.015 | 118.8% |
| 0.0116 | 0.03 | 0.058 | 0.0225 | 124.8% |
| 0.0155 | 0.04 | 0.078 | 0.03 | 126.5% |

Table 4 shows the impact of Na$_2$-EDG and combinations with calcium chloride on the 1-day strength of mortars prepared according to the same protocol, using Cement E. The combination of Na$_2$-EDG with calcium chloride allows a further increase of 1-day compressive strength.

TABLE 4

| EDG (% s/c) | CaCl2 (% s/c) | 1 d % blank |
|---|---|---|
| 0 | 0 | 100.0% |
| 0 | 0.03 | 108.8% |
| 0 | 0.06 | 122.8% |
| 0.01 | 0 | 112.7% |
| 0.01 | 0.03 | 123.2% |
| 0.02 | 0 | 118.2% |
| 0.02 | 0.06 | 127.6% |

Example 5: Addition of EDG Causes No Iron Staining

A test to evaluate iron staining of mortars was conducted. Cement W was weighed (259 g) and deposited in a plastic cylinder; sand was then added (1350 g) and the cylinder was manually and vigorously shaken for 30 seconds to allow the two components to blend. For mixes requiring the use of EDG, previously prepared mix water solutions were added to the Hobart mortar mixing bowl at this time; otherwise, the necessary amount of water (192 g) was weighed and added to the bowl. All samples had the same water-to-cement weight ratio of 0.74. The cement and sand blend was poured onto the water (or additive-containing water) in the bowl. The mixer was turned on and mixed at its lowest speed for 30 seconds, and then it was switched to its second lowest speed and allowed to mix for an additional 30 seconds. After this time, the mixer was stopped, the paddle and bowl were removed, and the mortar was stirred slightly in two revolutions with a spoon before being deposited (approximately 400 g) in a pre-labeled plastic bag. This bag was closed in such a way that all possible air was squished out. The bag was transported to an environmentally controlled room (54% relative humidity, 24° C.) with minimal traffic and allowed to sit for 7 days. After this time, a razor was used to make a slit in the bag (approximately 2 cm) near each corner, and the bag was allowed to sit for an additional 21 days in the controlled environment. At the end of this aging period, the region where the slits were cut were visually analyzed and photographed to document the findings related to iron staining. Yellow staining is defined as a yellow to orange shade to the mortar surface in the immediate vicinity of the cut slits. Samples containing no chemical admixtures (reference) and 0.02% $Na_2$-EDG (% cement weight) were prepared according to the above protocol, and no difference in color between the two samples were noticed, indicating that EDG does not cause yellow staining in finished products.

Example 6: Process for Making New Additive Compositions

This example describes the synthesis of ethylene-diglycine (EDG) by reacting mono-ethanolamine (MEA) with monochloracetic acid (MCA) in the presence of a sodium hydroxide (NaOH) and heat, to generate EDG and sodium chloride (NaCl).

The reaction products reported in Examples 6 through 18 included NaCl, a known strength enhancer, at 55-95% by weight of $Na_2$-EDG. The content of NaCl can be reduced to 0% by purification.

The reaction products reported in Examples 6 through 18 included impurities (i.e. compounds other than EDG and NaCl) at up to 12% of sample weight. The content of solid impurities was up to 40% of total solids in the reaction product mixture. The content of impurities can be reduced by optimizing the manufacturing process.

The synthesis was conducted by the following procedure: 10.91 g ethanolamine (0.175 moles), 56.01 g of 50% NaOH solution (0.700 moles) and 100 g of distilled water were charged into a 250 ml four neck round bottom flask. The flask was equipped with a condenser, a mechanical stirrer and a dropping funnel. Chloroacetic acid 33.08 g (0.350 moles) was dissolved in 24 grams of water and charged into the dropping funnel. Chloroacetic acid was slowly added to the flask over a period of 7 minutes. The reaction was then heated to a temperature of 90 degrees centigrade and held at that temperature for 5 hours. Additional 28.06 grams of 50% NaOH solution was added to complete the conversion of chloroacetic acid over the course of the reaction. The pH of the final product was 12.6.

Table 5 shows the early strengths (at Day 1) of mortars prepared with cements E, F, and I, described in FIG. 4A and FIG. 4B, in the presence of the informed percentages (% weight of solids and % weight of $Na_2$-EDG on cement weight or % s/c) of a commercial $Na_2$-EDG-based product manufactured by the process that involves monoethanolamine, formaldehyde, and sodium cyanide starting materials (named 'commercial') and of a product manufactured in the laboratory by combining MEA with MCA in the presence of NaOH. Table 5 shows the similar performance of the Example 6 sample compared to the 'commercial' sample.

TABLE 5

| Cement | Source of EDG | Dosage of solid reaction products (% s/c) | $Na_2$-EDG (% s/c) | 1 d % blank |
|---|---|---|---|---|
| E | — | 0 | | 100.0% |
| E | Commercial | 0.005 | 0.005 | 106.0% |
| E | Commercial | 0.01 | 0.01 | 119.6% |
| E | Commercial | 0.02 | 0.02 | 107.8% |

TABLE 5-continued

| Cement | Source of EDG | Dosage of solid reaction products (% s/c) | $Na_2$-EDG (% s/c) | 1 d % blank |
|---|---|---|---|---|
| E | Example 6 | 0.009 | 0.0059 | 112.1% |
| E | Example 6 | 0.017 | 0.0118 | 119.0% |
| E | Example 6 | 0.035 | 0.0236 | 117.0% |
| F | — | 0 | 0 | 100.0% |
| F | Commercial | 0.005 | 0.005 | 115.0% |
| F | Commercial | 0.01 | 0.01 | 117.8% |
| F | Commercial | 0.02 | 0.02 | 118.2% |
| F | Example 6 | 0.007 | 0.0044 | 113.6% |
| F | Example 6 | 0.015 | 0.0088 | 120.0% |
| F | Example 6 | 0.029 | 0.0177 | 126.1% |
| I | — | 0 | 0 | 100.0% |
| I | Commercial | 0.005 | 0.005 | 105.3% |
| I | Commercial | 0.01 | 0.01 | 107.7% |
| I | Commercial | 0.02 | 0.02 | 107.3% |
| I | Example 6 | 0.007 | 0.0044 | 114.4% |
| I | Example 6 | 0.015 | 0.0088 | 109.8% |
| I | Example 6 | 0.029 | 0.0177 | 110.2% |

Table 6 shows the characterization of these two sources of EDG ('commercial' or Sample A, and 'Example 6' or Sample B). Total solids was calculated by a standard oven method by determining the weight difference after drying the sample at 125±1° C. for 25±1 minutes, run in triplicates. EDG material was tested for its chloride content by Ion Chromatography with the column for anions analysis with autosuppressor and electrochemical detection (Dionex DX-500).

Figure 5:
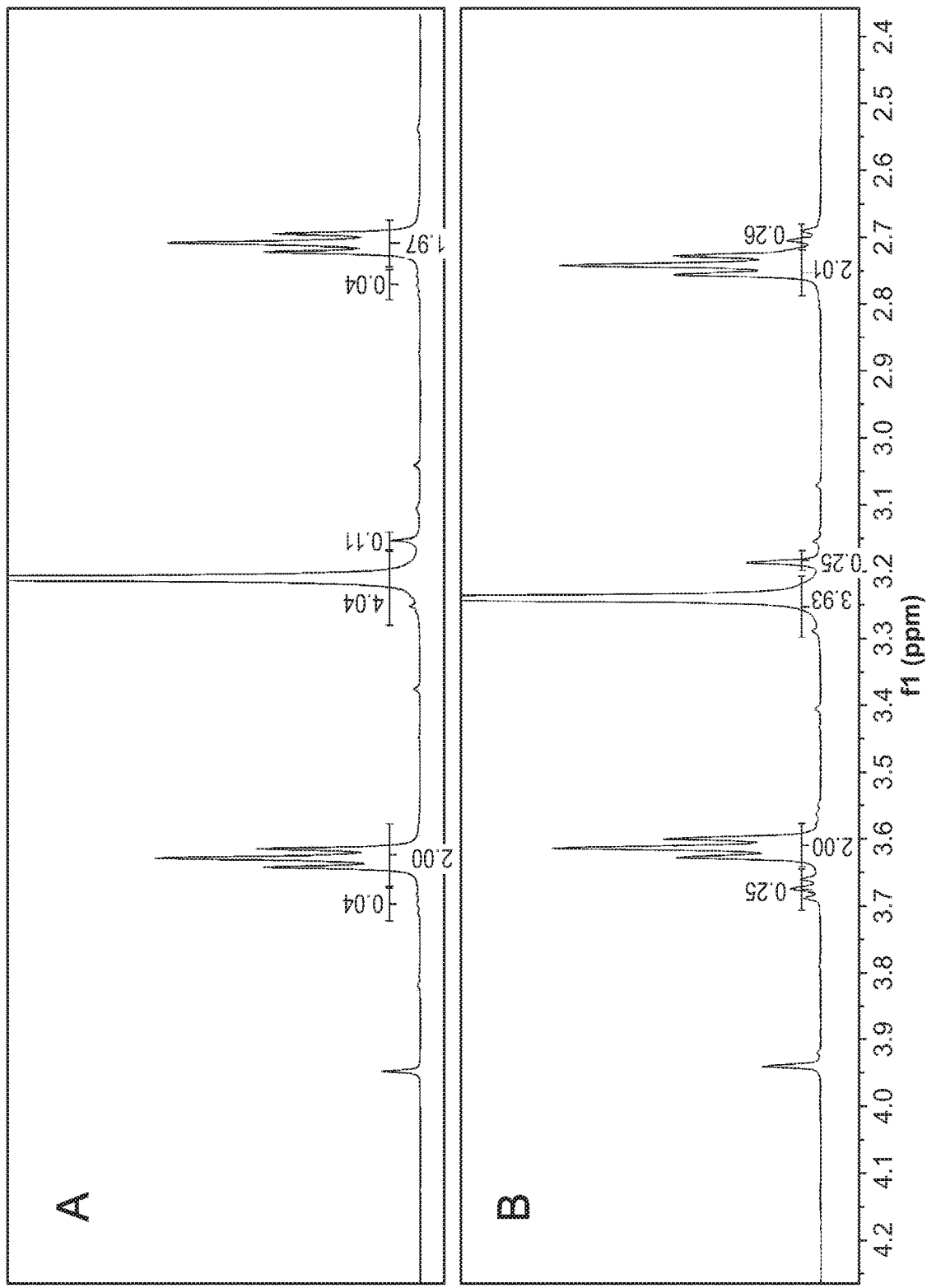
FIG. 5, panel A, shows the NMR spectrum of Sample A, described in Example 6.

Structure analysis of EDG material was performed by H1 liquid-state Nuclear Magnetic Resonance (NMR) Spectroscopy (Varian Unity INOVA 400 High resolution). FIG. 5 shows the NMR spectra of the two samples. NMR assignments (in ppm) are as follows: 2.71 (A), 2.74 (B) —NCH2- groups; 3.21 (A), 3.24 (B) Glycine —CH2- groups; 3.63 (A), 3.62 (B) —OCH2- groups.

The small differences in chemical shift between the two samples are due to differences in pH. Both samples show the major component is $Na_2$-EDG. Minor components are disodium ethanol monoglycinate and unidentified components.

TABLE 6

| Characteristic | Commercial EDG or Sample A | Example 6 EDG or Sample B |
|---|---|---|
| Total solids (%) | 30.41 ± 0.07 | 27.56 ± 0.09 |
| pH | 12.97 | 12.60 |
| Chloride (% of sample) | 1.006 | 5.230 |

Examples 7-11—Synthesis of $Na_2$-EDG

The MCA-MEA adducts were prepared by the same process as described in Example 6. Table 7 shows the amounts of MCA, MEA and alkali used for the reactions. The final products pH values are also shown.

TABLE 7

|  | Chloroacetic acid (MCA) | Ethanolamine (MEA) | Alkali addition | Product pH |
|---|---|---|---|---|
| Example 7 (19553-186) | 0.225 mol (21.3 grams) | 0.113 mol (7.02 grams) | Na$_2$CO$_3$ powder 0.676 mol (71.67 grams) | 9.8 |
| Example 8 (19553-188) | 0.350 mol (33.08 grams) | 0.175 mol (10.91 grams) | 50% NaOH solution 1.61 mol NaOH (90.01 grams solution)* | 12.9 |
| Example 9 (19553-189) | 0.350 mol (33.08 grams) | 0.175 mol (10.91 grams) | 50% NaOH solution 0.7 mol NaOH (56.01 grams solution) | 10.8 |
| Example 10 (19553-190) | 0.350 mol (33.08 grams) | 0.175 mol (10.91 grams) | NaOH pellet 0.35 mol NaOH (14.00 grams solution) | 3.3 |
| Example 11 (19553-191) | 0.350 mol (33.08 grams) | 0.183 mol (11.43 grams) | NaOH pellet 0.7 mol NaOH (28.01 grams solution) | NA |

*0.7 mol (56.01 grams of 50% solution) of NaOH is added first, then 34 grams of 50% NaOH solution was added during the course of the reaction.
NA: not available Example 12-18—Synthesis and Performance of Na$_2$-EDG The MCA-MEA adducts shown in Table 8 were prepared by similar process as described in Example 6 but under different temperatures and reaction times. Total solids was calculated by a standard oven as described in Example 6, and EDG content was determined by Ion Chromatography (IC). Set up for IC is Dionex DX-500 with column for anions analysis with auto-suppressor. EDG standard (acid form) at different concentrations was run to acquire calibration curve and, based on that, the amount of EDG (acid form) in the sample was calculated and recalculated to sodium salt form.

Table 9 shows the strength performance at 1 day of age of Examples 12-18 when tested in EN-196 mortars prepared with Cement F. Examples 12-18 show similar to superior performance compared to the 'commercial' sample.

TABLE 9

| Source of EDG | Dosage of solid reaction products (% s/c) | 1 d % blank |
|---|---|---|
| — | 0 | 100.00% |
| Commercial | 0.01 | 114.9% |
| Commercial | 0.02 | 116.3% |
| Example 12 | 0.01 | 115.6% |
| Example 12 | 0.02 | 124.4% |
| Example 13 | 0.01 | 113.8% |
| Example 13 | 0.02 | 118.5% |
| Example 14 | 0.01 | 113.6% |
| Example 14 | 0.02 | 116.7% |
| Example 15 | 0.01 | 115.6% |
| Example 15 | 0.02 | 119.4% |

TABLE 8

| | Nominal Molar Ratio (MCA:MEA:NaOH) | Reaction T (° C.) | Reaction time (h) | Theoretical Na$_2$-EDG Yield (mass %, based on reactor charges) | Na2-EDG (%) | EDG Yield (% of theoretical) |
|---|---|---|---|---|---|---|
| Example 12 0060-27 | 2:1:4 | 60 | 1 | 19.0% | 14.60 | 77 |
| Example 13 0060-33 | 2:1:6 | 60 | 0.5 | 15.5% | 10.38 | 67 |
| Example 14 0060-39 | 2:1:6 | 50 | 1 | 15.5% | 12.34 | 80 |
| Example 15 0060-41 | 2:1:6 | 40 | 4 | 15.5% | 9.87 | 64 |
| Example 16 0060-43 | 2:1:4 | 40 | 4 | 19.0% | 12.49 | 66 |
| Example 17 0060-45 | 2:1:4 | 50 | 2 | 16.6% | 14.70 | 89 |
| Example 18 0060-49 | 2:1:4 | 25 | n/a | 19.0% | 15.42 | 81 |

TABLE 9-continued

| Source of EDG | Dosage of solid reaction products (% s/c) | 1 d % blank |
|---|---|---|
| Example 16 | 0.01 | 125.0% |
| Example 16 | 0.02 | 121.7% |
| Example 17 | 0.01 | 113.9% |
| Example 17 | 0.02 | 118.2% |
| Example 18 | 0.01 | 127.3% |
| Example 18 | 0.02 | 126.9% |

Example 19: Formulation with EDG and Diethanolisopropanolamine (DEIPA) Provides Higher Early Strength than Formulations with Just One of These Amines A combination of EDG, diethanolisopropanolamine (DEIPA), and calcium chloride was evaluated for its ability to enhance either early strength, or late strength, or both of a cement. The Example 19 Cement was used to prepare the mortars. The results of the QXRD and XRF analyses of the Example 19 cement are presented below in Tables 10 and 11.

TABLE 10

QXRD analysis of Example 19 Cement

| Phase determined by QXRD | % weight |
|---|---|
| Alite | 66.2 |
| Belite | 9.9 |
| C4AF | 11.0 |
| C3A | 4.3 |
| CaO | 0.1 |
| MgO | 1.0 |
| Ca(OH)2 | 0.6 |
| Calcite | 0.9 |
| Gypsum | 2.6 |
| Hemihydrate | 0.0 |
| Anhydrite | 2.5 |

TABLE 11

XRF analysis of Example 19 Cement

| Analyte determined by XRF | Weight % |
|---|---|
| Total $SO_3$ | 2.71 |
| Total Alkali | 0.47 |

The mortars were prepared according to the protocol described in Example 1 using the Example 19 Cement, and the results of strength measurements were expressed as a change in MPa compared to a reference cement (DMPa). The results are presented in Table 12.

TABLE 12

Strength of Example 19 Cement

| Run | EDG ppm | DEIPA ppm | $CaCl_2$ ppm | DMPa 1 day | DMPa 3 day | DMPa 7 day | Total DMPa | Avg DMPa |
|---|---|---|---|---|---|---|---|---|
| 1 | 118 | 0 | 293 | 0.6 | 1 | 0.7 | 2.3 | 0.76 |
| 2 | 0 | 100 | 293 | 1.2 | 0.5 | −0.7 | 1.0 | 0.33 |
| 3 | 50 | 58 | 293 | 1.0 | 1.0 | 1.5 | 3.5 | 1.17 |

Runs 1 and 2 reported in Table 12 were done with either EDG or DEIPA alone, and resulted in the average strength increase ("Avg DMPa") of 0.76 and 0.33 MPa, respectively. Run 3 was done using a blend of EDG and DEIPA at similar total dosage. The average strength increase was 1.17 MPa.

Example 20: Effect of Selected Alkanol Amino Acid Grinding Stabilizing Additives, Selected Glycols and Selected Alkanolamines on Classifier Performance on Ground Solids Approximately 3.3 kg of commercial cement clinker was combined with 175 g of gypsum and ground in a laboratory-scale ball mill for approximately 3 hours to create a laboratory test cement containing no chemical additives. This cement was then stored in vacuum-packed containers until testing. On the day of testing, 220 g of cement was placed into a cylindrical plastic bottle along with several small metal balls. The chemical to be tested was first diluted in 0.4 g of water and then added to the plastic bottle at the desired dosage. The bottle was tightly sealed and the rotated on its side for 10 minutes to thoroughly distribute the chemical onto the cement powder. To create a blank cement sample with no chemical, 0.4 g of pure water was added and the same procedure was followed.

To perform a classifier test, an Alpine 100 MZR zigzag classifier was used. The rotation speed of the classifier was set to 5500 rpm give a cutoff particle size of 8 μm. This speed was maintained for all tests. 200 g of cement powder was then run through the classifier, and the coarse and fine fractions were collected and weighed. A feed sample that was not run through the classifier was also kept. Two repeats were conducted for each test.

After the classifier test, the feed sample and the coarse fraction were analyzed using a Malvern MasterSizer laser particle size analyzer. Based on the particle size distributions, the Tromp curve for the test was calculated. The Tromp curve is a plot, or dataset, representing the fractional amount of material in each size range that is returned into the coarse fraction of the classifier. In this example, an ideal Tromp curve would be 100% for all sizes above 8 μm, and 0% for all sizes below 8 μm. In actual tests, such behavior is not observed. In particular, some very fine particles are always returned into the coarse fraction. To quantify this, the area of the Tromp tail was measured from a particle size of 0.5 to 3.0 μm. The particle size of 3.0 μm has the lowest percent classified to the coarse fraction, a value known as the by-pass. Table 13 lists the Tromp tail areas for the blank and for a few different additives including EDG. Note that higher Tromp tail areas indicate more fines are present in the coarse material, and thus less efficient classifier performance.

TABLE 13

Classifier Test Results.

| Chemical | Dosage | Tromp area |
|---|---|---|
| TPG (pure grade) | 200 ppm | 53.5 |
| Dow Propylene Glycol Highers | 200 ppm | 57.3 |
| Triisopropanolamine (TIPA) | 200 ppm | 57.9 |
| Glycerol | 200 ppm | 58.2 |
| DOW TPG Bottoms | 200 ppm | 58.3 |
| Diethylene glycol (DEG) | 200 ppm | 59.2 |
| Diethanolisopropanolamine (DEIPA) | 200 ppm | 59.6 |
| Acetic acid | 200 ppm | 63.3 |
| Triethanolamine (TEA) | 200 ppm | 64.0 |
| EDG | 200 ppm | 69.3 |
| Blank | No chemical | 70.9 |

From Table 13 it can be seen that chemicals such as TIPA, DEIPA, and DEG, which are well-known and widely used grinding aids, give better classifier performance. Other glycols such as tripropylene glycol (TPG) and commercially available blends of TPG and higher order glycols (Dow Highers and Dow Bottoms) also give improved classifier performance. The characterization of the TPG Bottoms and Propylene Glycol Highers are described below in Example 22. On the other hand, EDG gives very similar performance as the blank. This indicates that EDG does not improve classifier performance, nor does it make it worse.

Example 21: Alkanol Amino Acid Grinding Stabilizing Additives and Various Propylene Glycol Additives Increase Surface Area of the Ground Solids The same steps for preparing cement powder, applying a chemical additive, and performing a classifier test were conducted as described above in Example 20. In this case, the coarse fraction returned from the classifier was tested using a die-crush test. A cylindrical steel die with an internal diameter of 32 mm was partially assembled by inserting the bottom piston. Then 25 g of material was placed into the die, and the top piston was put into place. The assembled die was placed into a hydraulic compression machine and a compressive force of 20,000 lb was applied for 30 seconds. This force corresponds to an average pressure of 111 MPa applied to the sample, which is similar to the maximum pressure applied by the roller of a VRM.

The sample was removed from the die, now compressed into a disk shaped compact. The disk was placed into a plastic bag and broken up using finger pressure until no agglomerated particles could be felt. The powder from the die-crush test was then analyzed using a Malvern MasterSizer laser particle size analyzer, along with a sample of the same material that was not subjected to the die-crush test. In order to quantify the amount of particle comminution that occurred in the test, the surface area of the powder calculated from the PSD test by the instrument software was used. Table 14 lists the change in surface area caused by the die crush test for various chemicals. Larger surface area change indicates more particle comminution, which is beneficial for grinding.

TABLE 14

Results of die-crush testing.

| Chemical | Dosage | Surface area increase |
|---|---|---|
| EDG | 200 ppm | 14.9% |
| TPG (pure grade) | 200 ppm | 14.3% |
| DOW TPG Bottoms | 200 ppm | 12.9% |
| Triisopropanolamine (TIPA) | 200 ppm | 12.5% |
| Dow Propylene Glycol Highers | 200 ppm | 12.4% |
| Glycerol | 200 ppm | 12.4% |
| Diethanolisopropanolamine (DEIPA) | 200 ppm | 11.3% |
| Blank | No chemical | 11.1% |
| Diethylene glycol (DEG) | 200 ppm | 11.1% |
| Triethanolamine (TEA) | 200 ppm | 10.0% |
| Acetic acid | 200 ppm | 9.6% |

Surprisingly, the EDG performs the best in the die-crush test of all the additives tested, in that the surface area is increased by the greatest percentage. Pure TPG also performed very well in this test. Taken together, the results shown in Examples 20 and 21 indicate that EDG may improve the grinding performance by a different mechanism than other chemicals that are currently used as grinding aids. For example, diethylene glycol (DEG) is a widely used and effective grinding aid for cement clinker. DEG improves the classifier efficiency of the cement powder, resulting in less fine material returned in the coarse material (Table 13). DEG also improves the grinding efficiency of the powder (Table 14). This is not surprising because it is well known that the presence of fine particles interferes with the particle comminution process, so it follows that removal of fine particles will improve the die-crush test results. This mechanism would also apply to other additives including TIPA and commercial blended glycols.

On the other hand, this mechanism does not apply to EDG. As described above in Example 20, the EDG sample was no more efficient at removing fines during the classifier test than was the blank, yet, as described in Example 21, it improved the die-crush performance as compared to the blank and as compared to other well-known grinding additives such as DEG. Therefore, this indicates that EDG improves the crushing performance by a different mechanism. The chemicals being tested are known to adsorb onto the surface of the particles in a thin layer, which would have an effect on how easy or difficult it is for particles to rearrange and slide past each other under a load. A powder that rearranges easily may give worse crushing performance, because the particles are able to rearrange into a more stable configuration that distributes the load among a greater number of particles, resulting in less particle fracture. On the other hand, if particles have a difficult time rearranging then a smaller number of particles will support the load, resulting in high stresses and fracture in those particles. The results shown in Examples 20 and 21 suggest that EDG may improve the crushing behavior by restricting particle rearrangement.

Example 22: Analysis of TPG Bottoms and Propylene Glycol Highers

The TPG Bottoms and Propylene Glycol Highers samples were characterized using gas chromatography mass spectroscopy (GC/MS). Specifically, an Angilent 7890A+5975C Inert MSD GC/MS with a 30 m×250 µm×0.25 µm column, 280° C. front inlet temperature, and 50:1 split. The oven was kept at 35° C. for 10 min and then heated up to 200° C. at a rate of 10° C./min, and then kept at 200° C. for 10 min. 1 µL of each sample was injected into the column. The carrier gas was helium set to 1 ml/min.

The results from the GC/MS analysis showed three peaks at retention times of 15.4, 19.4, and 24.5 min. Using propylene glycol, dipropylene glycol and tripropylene glycol standards, the peak at 15.4 was identified as tripropylene glycol. The peaks at 19.4 and 24.5 also showed consistent fragment peaks similar to those seen from the tripropylene glycol, but with additional higher molecular weight fragments.

Table 15 summarizes the results of the TPG Bottoms and Propylene Glycol Highers analysis.

TABLE 15

Composition of TBP Bottoms and Propylene Glycol Highers

| | TPG | Higher Propylene Glycol (19.4 min) | Higher Propylene Glycol (24.5 min) | Total |
|---|---|---|---|---|
| TPG Bottoms | 0.5 | 92.7 | 6.7 | 100 |
| Propylene Glycol Highers | 29.4 | 65.5 | 7.6 | 102.4 |

While this invention has been particularly shown and described with references to example embodiments thereof, it will be understood by those skilled in the art that various changes in form and details may be made therein without departing from the scope of the invention encompassed by the appended claims.

What is claimed is:

1. A method for grinding a solid in a vertical roller mill (VRM), comprising:
    grinding at least one solid in the presence of a grinding stabilizing additive, wherein the grinding stabilizing additive comprises an alkanol amino acid compound or a disodium or dipotassium salt thereof having the structural formula:

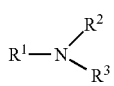

wherein:
    $R^1$ is $(C_1-C_4)$alkyl-OH; and
    $R^2$ and $R^3$, each independently, is $(C_0-C_3)$alkyl-COOR*, wherein R* is H, Na$^+$, K$^+$, or ½ Ca$^{++}$, wherein the grinding stabilizing additive is a liquid.

2. The method of claim 1, wherein the solid comprises one or more of a cement clinker, limestone, gypsum, a supplemental cementitious matter, or a mixture thereof.

3. The method of claim 1, wherein the grinding stabilizing additive comprises ethanol diglycine (EDG), isopropanol diglycine (IPDG), disodium EDG, dipotassium EDG, disodium IPDG, dipotassium IPDG or mixture thereof; wherein the EDG, IPDG, disodium EDG, dipotassium EDG, disodium IPDG, dipotassium IPDG or mixture thereof is present in an amount of 0.001-0.04% based on dry weight of solid being ground.

4. The method of claim 1 further including grinding the solid in the presence of at least one supplemental additive chosen from:
    (A) a grinding agent chosen from a glycol or glycerin, in the amount of 0.001% to 0.1% based on dry weight of the solid being ground;
    (B) a supplemental agent chosen from a tertiary alkanolamine or an acetate salt thereof, in the amount of 0.001-0.1% based on dry weight of the solid being ground;
    (C) a set retarding agent chosen from gluconate salt, a molasses, sucrose, or a corn syrup, in the amount of 0.001% to 0.06% based on dry weight of the solid being ground;
    (D) a set accelerating agent chosen from a thiocyanate salt, chloride salt, or mixture thereof, in the amount of 0.001% to 0.2% based on dry weight of the solid being ground;
    (E) a dispersing agent chosen from sodium acetate, potassium acetate, or mixture thereof in the amount of 0.005% to 0.1% based on dry weight of the solid being ground.

5. The method of claim 4, wherein the supplemental agent is chosen from triethanolamine ("TEA"), triisopropanolamine ("TIPA"), diethanolpropanolamine ("DEIPA"), ethanoldiisopropanolamine ("EDIPA"), tetrahydroxyethyl ethylenediamine ("THEED"), the acetate of any of the foregoing, or a mixture of any of the foregoing.

6. The method of claim 1, wherein the grinding stabilizing additive comprises EDG, IPDG, disodium EDG, dipotassium EDG, disodium IPDG, dipotassium IPDG or a mixture thereof;
    the method further including grinding the solid in the presence of at least one agent chosen from: (A) at least one of DEIPA, EDIPA, TIPA, TEA, THEED, DEIPA acetate, EDIPA acetate, TIPA acetate, TEA acetate, THEED acetate, or a mixture thereof; and (B) sodium acetate, potassium acetate, or mixture thereof; or a mixture of (A) and (B).

7. The method of claim 1, wherein the solid includes a supplemental cementitious material chosen from fly ash, granulated blast furnace slag, limestone, calcined clay, natural pozzolan, and artificial pozzolan.

8. The method of claim 1, wherein the solid includes a cement clinker,
    the method further including grinding the solid in the presence of at least two agents chosen from a grinding agent, a set retarding agent, a set accelerating agent, or a dispersing agent.

9. The method of claim 1, wherein the solid includes a cement clinker;
    the method including grinding the solid in the presence of a grinding agent, and further wherein:
        the grinding stabilizing additive is present in the amount of from 0.001% to 0.04% based on dry weight of the solid being ground, and
        the grinding agent is present in the amount of from 0.001% to 0.10% based on dry weight of the solid being ground.

10. The method of claim 9, wherein the grinding agent is present in the amount of from 0.005% to 0.02% based on the dry weight of the solid being ground.

11. The method of claim 1, wherein the solid includes a cement clinker,
    the method further including grinding the solid in the presence of a grinding agent, and a supplemental agent chosen from a tertiary alkanolamine or an acetate salt thereof, wherein:
        the grinding stabilizing additive is present in the amount of 0.001-0.04% based on dry weight of the solid being ground;

the grinding agent is present in the amount of from 0.001% to 0.10% based on dry weight of the solid being ground; and the supplemental agent is present in the amount of 0.001-0.04% based on dry weight of the solid being ground.

12. The method of claim 1, wherein the solid includes a cement clinker,
the method further including grinding the solid in the presence of a grinding agent and a set retarding agent, wherein:
the grinding stabilizing additive is present in the amount of from 0.001% to 0.04% based on dry weight of the solid being ground,
the grinding agent is present in the amount of from 0.001 to 0.1% based on dry weight of the solid being ground, and
the set retarding agent is present in the amount of from 0.001% to 0.03% based on dry weight of the solid being ground.

13. The method of claim 1, wherein the solid includes a cement clinker,
the method further including grinding the solid in the presence of a grinding agent and a set accelerating agent, wherein:
the grinding stabilizing additive is present in the amount of from 0.001% to 0.04% based on dry weight of the solid being ground,
the grinding agent is present in the amount of from 0.001% to 0.1% based on dry weight of the solid being ground, and
the set accelerating agent is present in the amount of from 0.001% to 0.2% based on dry weight of the solid being ground.

14. The method of claim 1, wherein the solid includes a cement clinker,
the method further including grinding the solid in the presence of a grinding agent and a dispersing agent, wherein:
the grinding stabilizing additive is present in the amount of from 0.001% to 0.04% based on dry weight of the solid being ground,
the grinding agent is present in the amount of from 0.001% to 0.1% based on dry weight of the solid being ground, and
the dispersing agent is present in the amount of 0.005% to 0.1% based on dry weight of the solid being ground.

15. The method of claim 1, the method further including grinding the solid in the presence of a grinding agent chosen from glycol, glycerin, acetic acid or its salt, or a mixture thereof.

16. The method of claim 1, the method further including grinding the solid in the presence of a set retarding agent chosen from a gluconate salt, a molasses, sucrose, corn syrup, or mixture thereof.

17. The method of claim 1, the method further including grinding the solid in the presence of a set accelerating agent chosen from a thiocyanate salt, a chloride salt, or mixture thereof.

18. The method of claim 1, wherein the grinding stabilizing additive is (a) EDG, (b) IPDG, (c) or a mixture thereof, or (d) a salt of any of (a), (b), or (c); and
the method further including grinding the solid in the presence of a glycol, sodium gluconate, and a set accelerating agent chosen from sodium chloride or sodium thiocyanate.

19. The method of claim 1, wherein the grinding stabilizing additive is EDG or an EDG salt.

20. The method of claim 1, wherein the grinding stabilizing additive is IPDG or an IPDG salt.

21. The method of claim 1, wherein the solid is a cement clinker, the method further including grinding the cement clinker with an alkali sulfate.

22. A method of claim 1, wherein the grinding stabilizing additive is made by a process, comprising: reacting a haloacetic acid chosen from monochloroacetic acid and monobromoacetic acid, or a salt thereof, with an alkanolamine chosen from ethanolamine, isopropanolamine, and isobutanolamine under alkaline conditions to generate the grinding stabilizing additive represented by the structural formula

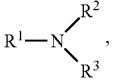

wherein:
$R^1$ is $(C_1\text{-}C_4)$alkyl-OH;
$R^2$ and $R^3$, each independently, represent —$CH_2COO^-$ $R^*$, and
$R^*$ is H, $Na^+$, $K^+$, or ½ $Ca^{++}$.

23. The method of claim 22 wherein the haloacetic acid or its salt is chloroacetic acid or its salt, and $R^1$ is —$CH_2CH_2OH$ (ethanol), —$CH_2$—$CH(CH_3)$—OH (isopropanol), or mixture thereof.

24. The method of claim 1, wherein the grinding stabilizing additive is disodium ethanol-diglycine represented by the structural formula

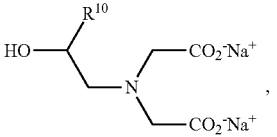

wherein $R^{10}$ is H or —$CH_3$.

25. The method of claim 1, wherein the grinding stabilizing additive comprises EDG, IPDG, or mixtures of the foregoing diglycines; diethylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

26. The method of claim 1, wherein the grinding stabilizing additive comprises EDG, IPDG, or a mixture of the forgoing diglycines; tripropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

27. The method of claim 1, wherein the grinding stabilizing additive comprises EDG, IPDG, or a mixture of the foregoing diglycines; at least one glycol chosen from diethylene glycol, tripropylene glycol, and tetrapropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

28. The method of claim 1, wherein the grinding stabilizing additive comprises at least one glycol chosen from diethylene glycol, tripropylene glycol, and tetrapropylene glycol and at least one alkanolamine chosen from TEA, DEIPA, EDIPA, TIPA, THEED, the acetate of any of the foregoing alkanolamines, or a mixture of any of the foregoing alkanolamines and acetates thereof.

29. The method of claim 1, wherein the grinding stabilizing additive comprises tripropylene glycol and at least one alkanolamine chosen from TEA, DEIPA, EDIPA, TIPA, THEED, the acetate of any of the foregoing alkanolamines, or a mixture of any of the foregoing alkanolamines and acetates thereof.

30. The method of claim 1, wherein the grinding stabilizing additive comprises EDG; tripropylene glycol (TPG); and at least one alkanolamine chosen from TEA, DEIPA, EDIPA, TIPA, THEED, the acetate of any of the foregoing alkanolamines, or a mixture of any of the foregoing alkanolamines and acetates thereof.

31. An additive composition for grinding, comprising: (a) EDG, IPDG, or mixture thereof; and (b) at least one alkanolamine chosen from DEIPA, EDIPA, TIPA, TEA, THEED, DEIPA acetate, EDIPA acetate, TIPA acetate, TEA acetate, THEED acetate, or a mixture thereof.

32. The additive composition of claim 31 further comprising sodium acetate.

33. An additive composition for grinding, comprising EDG or IPDG, or a mixtures of the forgoing diglycines; diethylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

34. An additive composition for grinding, comprising EDG, IPDG, or a mixture of the forgoing diglycines; tripropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

35. An additive composition for grinding, comprising EDG, IPDG, or a mixture of the foregoing diglycines; at least one glycols chosen from diethylene glycol, tripropylene glycol, and tetrapropylene glycol; and at least one alkanolamine chosen from TEA, DEIPA, EDIPA, TIPA, THEED, the acetate of any of the foregoing alkanolamines, or a mixture of any of the foregoing alkanolamines and acetates thereof.

* * * * *